United States Patent
Rieder et al.

(10) Patent No.: US 7,412,903 B2
(45) Date of Patent: Aug. 19, 2008

(54) IN-LINE MEASURING DEVICES AND METHOD FOR COMPENSATION MEASUREMENT ERRORS IN IN-LINE MEASURING DEVICES

(75) Inventors: Alfred Rieder, Landshut (DE); Wolfgang Drahm, Freising (DE); Hao Zhu, München (DE)

(73) Assignee: Endress + Hauser Flowtec AG, Landshut (DE)

( * ) Notice: Subject to any disclaimer, the term of this patent is extended or adjusted under 35 U.S.C. 154(b) by 37 days.

(21) Appl. No.: 11/435,855

(22) Filed: May 18, 2006

(65) Prior Publication Data

US 2006/0272428 A1    Dec. 7, 2006

Related U.S. Application Data

(60) Provisional application No. 60/682,017, filed on May 18, 2005.

(30) Foreign Application Priority Data

May 18, 2005    (EP) .................................. 05010753

(51) Int. Cl.
*G01F 1/84*    (2006.01)
(52) U.S. Cl. .............................. 73/861.357; 73/861.355
(58) Field of Classification Search ................................
73/861.355–861.357
See application file for complete search history.

(56) References Cited

U.S. PATENT DOCUMENTS

2005/0044929 A1    3/2005 Gysling (Continued)

FOREIGN PATENT DOCUMENTS

DE    10 2004 056 235 A1    4/2006

(Continued)

OTHER PUBLICATIONS

R.P. Liu et al., "A neural network to correct mass flow errors caused by two-phase flow in a digital coriolis mass flowmeter", pp. 53-63, XP-002355593, 2001.

(Continued)

*Primary Examiner*—Harshad Patel
(74) *Attorney, Agent, or Firm*—Bacon & Thomas, PLLC

(57) ABSTRACT

An inline measuring device comprises a vibratory-type transducer and a measuring device electronics electrically coupled with the vibratory-type transducer. The vibratory-type transducer includes at least one measuring tube being inserted into the course of a pipeline and serving for conducting a mixture to be measured. An exciter arrangement acting on the measuring tube for causing the at least one measuring tube to vibrate and a sensor arrangement sensing vibrations of the at least one measuring tube and delivering at least one oscillation measurement signal representing oscillations of the measuring tube. The measuring device electronics delivers an excitation current driving the exciter arrangement. Further, the inline measuring device electronics is adapted to produce a measured value representing the physical, measured quantity of the mixture to be measured. Therefor, the measuring device electronics estimates from the excitation current and from said at least one oscillation measurement signal a Coriolis coupling coefficient. This Coriolis coupling coefficient corresponds with an instantaneous coupling between a first natural eigenmode of the measuring tube currently driven by the exciter arrangement and a second natural eigenmode of said measurement tube. In this second eigenmode the measurement tube has an eigenform corresponding with a mode of vibration caused by Coriolis forces induced in the flowing mixture. Due to a variation of a concentration of at least one of a component of the mixture the Coriolis coupling coefficient varies in time.

26 Claims, 7 Drawing Sheets

U.S. PATENT DOCUMENTS

2006/0272428 A1* 12/2006 Rieder et al. ........... 73/861.357
2007/0180929 A1* 8/2007 Rieder et al. ............ 73/861.17
2007/0186686 A1* 8/2007 Drahm et al. .......... 73/861.357

FOREIGN PATENT DOCUMENTS

WO    WO 2004/027350 A3    4/2004

OTHER PUBLICATIONS

H. Raszillier et al., "Coriolis-effect in mass flow metering", pp. 192-214, Archive Mechanics, XP009057633, 1991.

* cited by examiner

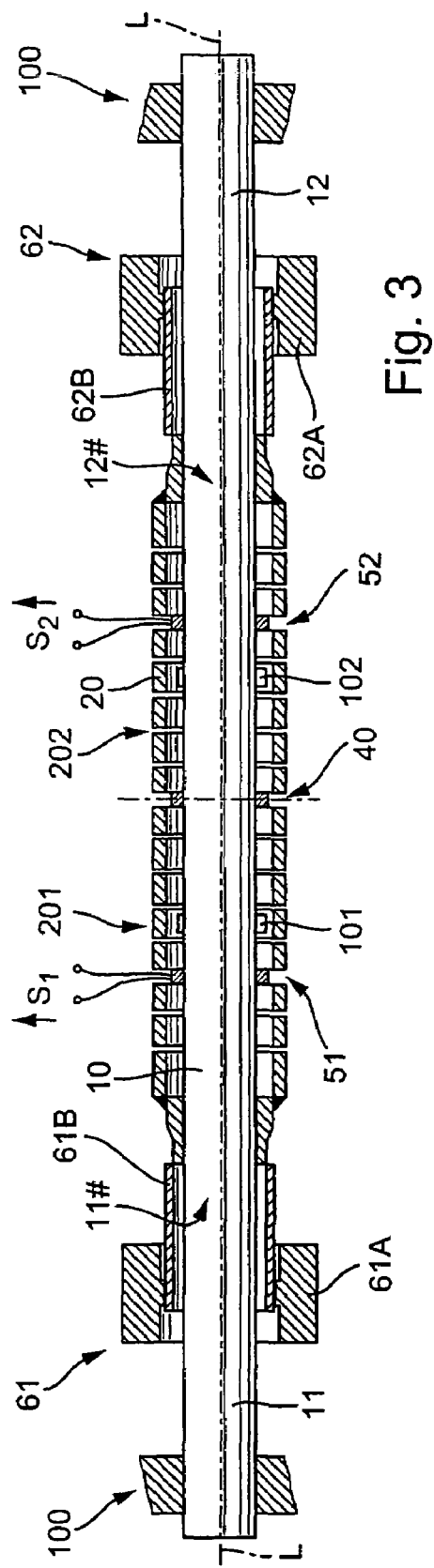
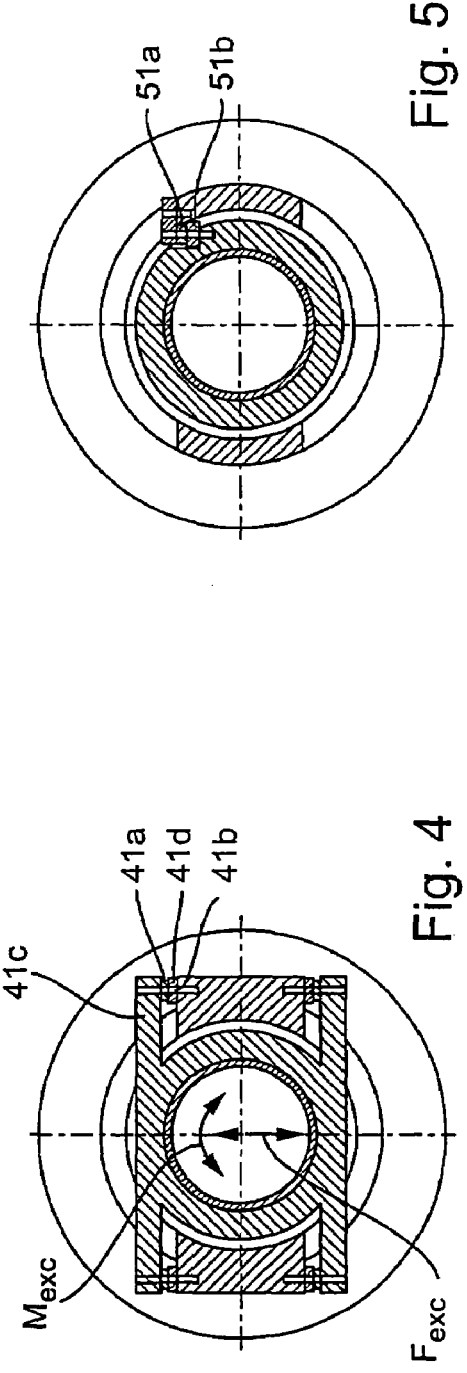

1 : Sound Speed Sensor
2 : Pressure Sensor

IN-LINE MEASURING DEVICES AND METHOD FOR COMPENSATION MEASUREMENT ERRORS IN IN-LINE MEASURING DEVICES

FIELD OF THE INVENTION

The invention relates to an In-line measuring device having a transducer of the vibratory-type, especially a Coriolis mass-flow/density measuring device for a medium, especially a two, or more, phase medium flowing in a pipeline, as well as a method for producing by means of such a vibratory transducer a measured value representing a physical, measured quantity of the medium, for example a mass flow rate, a density and/or a viscosity. Further, the invention relates to a method for compensation, in such In-line measuring devices, measurement errors caused by two-phase or multi-phase mixtures.

BACKGROUND OF THE INVENTION

In the technology of process measurements and automation, the measurement of physical parameters of a medium flowing in a pipeline, parameters such as e.g. the mass flow rate, density and/or viscosity, such inline measuring devices, especially Coriolis mass flow measuring devices, are used, which bring about reaction forces in the medium, such as e.g. Coriolis forces corresponding to the mass flow rate, inertial forces corresponding to the density, or frictional forces corresponding to the viscosity, etc., by means of a transducer of the vibratory-type—hereinafter vibratory transducer—inserted into the course of the pipeline carrying the medium and traversed during operation by the medium, and by means of a measurement and operating circuit connected therewith. Derived from these reaction forces, the measuring devices then produce a measurement signal representing the particular mass flow rate, the particular viscosity and/or the particular density of the medium. Inline measuring devices of this type, utilizing a vibratory transducer, as well as their manner of operation, are known per se to those skilled in the art and are described in detail in for e.g. WO-A 03/095950, WO-A 03/095949, WO-A 03/076880, WO-A 02/37063, WO-A 01/33174, WO-A 00/57141, WO-A 99/39164, WO-A 98/07009, WO-A 95/16897, WO-A 88/03261, US 2003/0208325, U.S. Pat. No. 6,745,135, U.S. Pat. No. 6,691,583, U.S. Pat. No. 6,651,513, U.S. Pat. No. 6,636,815, U.S. Pat. No. 6,513,393, U.S. Pat. No. 6,505,519, U.S. Pat. No. 6,311, 136, U.S. Pat. No. 6,006,609, U.S. Pat. No. 5,869,770, U.S. Pat. No. 5,796,011, U.S. Pat. No. 5,616,868, U.S. Pat. No. 5,602,346, U.S. Pat. No. 5,602,345, U.S. Pat. No. 5,531,126, U.S. Pat. No. 5,301,557, U.S. Pat. No. 5,253,533, U.S. Pat. No. 5,218,873, U.S. Pat. No. 5,069,074, U.S. Pat. No. 4,876, 898, U.S. Pat. No. 4,733,569, U.S. Pat. No. 4,660,421, U.S. Pat. No. 4,524,610, U.S. Pat. No. 4,491,025, U.S. Pat. No. 4,187,721, EP-A 1 291 639, EP-A 1 281 938, EP-A 1 001 254 or EP-A 553 939.

For guiding the medium, the vibratory transducers include at least one measuring tube with a straight tube segment held in a, for example, tubular or box-shaped, support frame. For producing the above-mentioned reaction forces during operation, the tube segment is caused to vibrate, driven by an electromechanical exciter arrangement. For registering vibrations of the tube segment, particularly at its inlet and outlet ends, the vibratory transducers additionally include an electrophysical sensor arrangement reacting to movements of the tube segment.

In the case of Coriolis mass flow measuring devices, the measurement of the mass flow rate of a medium flowing in a pipeline rests, for example, on having the medium flow through the measuring tube inserted into the pipeline and oscillating during operation laterally to a measuring tube axis, whereby Coriolis forces are induced in the medium. These, in turn, effect that the inlet and outlet end regions of the measuring tube oscillate shifted in phase relative to one another. The magnitude of this phase shift serves as a measure of the mass flow rate. The oscillations of the measuring tube are, to this end, registered by means of two oscillation sensors of the above-mentioned sensor arrangement separated from one another along the length of the measuring tube and are transformed into oscillation measurement signals, from whose phase shift relative to one another the mass flow rate is derived.

The above-mentioned U.S. Pat. No. 4,187,721 mentions, further, that the instantaneous density of the flowing medium can also be measured by means of such inline measuring devices, and, indeed, on the basis of a frequency of at least one of the oscillation measurement signals delivered from the sensor arrangement. Moreover, usually also a temperature of the medium is directly measured in suitable manner, for example by means of a temperature sensor arranged on the measuring tube. Additionally, straight measuring tubes can, as is known, upon being excited to torsional oscillations about a torsional oscillation axis extending essentially parallel to, or coinciding with, the longitudinal axis of the measuring tube, effect that radial shearing forces are produced in the medium as it flows through the tube, whereby significant oscillation energy is withdrawn from the torsional oscillations and dissipated in the medium. As a result of this, a considerable damping of the torsional oscillations of the oscillating measuring tube occurs, so that, additionally, electrical exciting power must be added, in order to maintain the torsional oscillations. On the basis of the electrical exciting power required to maintain the torsional oscillations of the measuring tube, the vibratory transducer can also be used to determine, at least approximately, a viscosity of the medium; compare, in this connection also U.S. Pat. No. 4,524,610, U.S. Pat. No. 5,253, 533, U.S. Pat. No. 6,006,609 or U.S. Pat. No. 6,651,513. It can, consequently, assumed, without more in the following, that, even when not expressly stated, modern inline measuring devices using a vibratory transducer, especially Coriolis mass flow measuring devices, have the ability to measure, in any case, also density, viscosity and/or temperature of the medium, especially since these are always needed anyway in the measurement of mass flow rate for the compensation of measurement errors arising from fluctuating density and/or viscosity of the medium; compare, in this connection, especially the already mentioned U.S. Pat. No. 6,513,393, U.S. Pat. No. 6,006,609, U.S. Pat. No. 5,602,346, WO-A 02/37063, WO-A 99/39164 or also WO-A 00/36379. Due to their high accuracy and their high flexibility, inline measuring devices with a vibratory transducer, especially Coriolis flowmeters, are widely used in industry for mass flow and density measurement of single-phase liquids or gases of such devices.

Nevertheless it is also known that the accuracy of such devices may decrease significantly, if a second phase is mixed with the processed liquid. In the application of inline measuring devices using a vibratory measurement-pickup, it has, however, become evident, as also discussed, for example, in JP-A 10-281846, WO-A 03/076880, EP-A 1 291 639, U.S. Pat. No. 6,505,519 or U.S. Pat. No. 4,524,610, that, in the case of such inhomogeneous media, especially two, or more, phase media, the oscillation measurement signals derived from the oscillations of the measuring tube, especially also the mentioned phase shift, can be subject to fluctuations to a considerable degree and, thus, in some cases, can be completely unusable for the measurement of the desired physical parameters, without the use of auxiliary measures, this in spite of keeping the viscosity and density in the individual phases of the medium, as well as also the mass flow rate, practically constant and/or appropriately taking them into consideration. Such inhomogeneous media can, for example, be liquids, into which, as is e.g. practically unavoidable in dosing or bottling processes, a gas, especially air, present in the pipeline is entrained or out of which a dissolved medium, e.g. carbon dioxide, outgasses and leads to foam formation. As other examples of such inhomogeneous media, emulsions and wet, or saturated, steam can be named. As causes for the fluctuations arising in the measurement of inhomogeneous media by means of vibratory transducers, the following can be noted by way of example: the unilateral clinging or deposit of gas bubbles or solid particles, entrained in liquids, internally on the measuring tube wall, and the so-called "bubble-effect", where gas bubbles entrained in the liquid act as flow bodies for liquid volumes accelerated transversely to the longitudinal axis of the measuring tube.

In particular, such gas bubbles can cause significant errors. To explain this phenomenon of the bubble effect, the "bubble theory" was proposed by Grumski et al. [Grumski, J. T., and R. A. Bajura, *Performance of a Coriolis-Type Mass Flowmeter in the Measurement of Two-phase (air-liquid) Mixtures, Mass Flow Measurements ASME Winter Annual Meeting*, New Orleans, La. (1984)] and Hemp et al. [Hemp, J. and Sultan, G., *On the Theory and Performance of Coriolis Mass Flowmeter, Proceedings of the International Conference on Mass Flow Measurement, IBC technical Services*, London, 1989]. This theory is based on the main idea that, on the one hand, a density error, which in operation could be detected between a given true density and a measured apparent density, is proportional to the individual concentrations of the phases, and that the respective mass flow error may be strictly proportional to this density error, on the other hand. In other words, according to this theory, density and mass flow errors may be directly coupled.

While, for decreasing the measurement errors associated with two, or more, phase media, a flow, respectively medium, conditioning preceding the actual flow rate measurement is proposed in WO-A 03/076880, both JP-A 10-281846, U.S. Pat. No. 6,311,136 and U.S. Pat. No. 6,505,519, for example, describe a correction of the flow rate measurement, especially the mass flow rate measurement, based on the oscillation measurement signals, which correction rests especially on the evaluation of deficits between a highly accurately measured, actual medium density and an apparent medium density determined by means of Coriolis mass flow measuring devices during operation. Especially in U.S. Pat. No. 6,505,519 or U.S. Pat. No. 6,311,136 there are also describe a correction method for mass flow errors. This does also base on said bubble theory essentially, and, thus, uses density errors, detected between a reference and an apparent density, to compensate mass flow errors caused by two-phase or multi-phase mixture.

In particular, pre-trained, in some cases even adaptive, classifiers of the oscillation measurement signals are proposed for this. The classifiers can, for example, be designed as a Kohonen map or neural network, and the correction is made either on the basis of some few parameters, especially the mass flow rate and the density measured during operation, as well as other features derived therefrom, or also using an interval of the oscillation measurement signals encompassing one or more oscillation periods. The use of such a classifier brings, for example, the advantage that, in comparison to conventional Coriolis mass flow/density meters, no, or only very slight, changes have to be made at the vibratory transducer, in terms of mechanical construction, the exciter arrangement or the operating circuit driving such, which are specially adapted for the particular application. However, a considerable disadvantage of such classifiers includes, among others, that, in comparison to conventional Coriolis mass flow measuring devices, considerable changes are required in the area of the measured value production, above all with regards to the analog-to-digital transducer being used and the microprocessors. As, namely, also described in U.S. Pat. No. 6,505,519, required for such a signal evaluation, for example, in the digitizing of the oscillation measurement signals, which can exhibit an oscillation frequency of about 80 Hz, is a sampling rate of about 55 kHz or more, in order to obtain a sufficient accuracy. Stated differently, the oscillation measurement signals have to be samples with a sampling ratio of far above 600:1. Beyond this, also the firmware stored and executed in the digital measurement circuit is correspondingly complex. A further disadvantage of such classifiers is that they must be trained and correspondingly validated for the conditions of measurement actually existing during operation of the vibratory transducer, be it regarding the particulars of the installation, the medium to be measured and its usually variable properties, or other factors influencing the accuracy of measurement. Because of the high complexity of the interplay of all these factors, the training and its validation can occur ultimately only on site and individually for each vibratory transducer, this in turn meaning a considerable effort for the startup of the vibratory transducer. Finally, it has been found, that such classifier algorithms, on the one hand because of the high complexity, on the other because of the fact that usually a corresponding physical-mathematical model with technically relevant or comprehensible parameters is not explicitly present, exhibit a very low transparency and are, consequently, often difficult to explain. Accompanying this situation, it is clear that considerable reservations can occur on the part of the customer, with such acceptance problems especially arising when the classifier, additionally, is self-adapting, for example a neural network.

As a further possibility for getting around the problem of inhomogeneous media, it is proposed, for instance, in U.S. Pat. No. 4,524,610 to install the vibratory transducer such that the straight measuring tube extends essentially vertically, in order to prevent, as much as possible, a deposition of such disturbing, especially gaseous, inhomogeneities. Here, however, one is dealing with a very special solution which cannot always be implemented, without more, in the technology of industrial process measurement. On the one hand, in this case, it can happen, namely, that the pipeline, into which the vibratory transducer is to be inserted, might have to be adapted to the vibratory transducer, rather than the reverse, which can mean an increased expense for implementing the measurement location. On the other hand, as already mentioned, the measuring tubes might have a curved shape, in which case the problem cannot always be solved satisfactorily by an adapting of the installation orientation anyway. It has, moreover, been found in this case that the aforementioned corruptions of the measurement signal are not necessarily prevented with certainty by the use of a vertically installed, straight measuring tube anyway.

Furthermore, it has been found that despite of the compensation of mass flow errors based on reference and apparent density, particularly applied in consideration of said bubble effect, in any cases mass flow errors could not be eliminated perfectly. Especially it has been found that this theory can only explain negative density and mass flow errors, whereas it can not explain positive errors observed in several experiments.

SUMMARY OF THE INVENTION

An object of the invention is, therefore, to provide a corresponding inline measuring device, especially a Coriolis mass flow measuring device, that is suited for measuring a physical, measured quantity, especially mass flow rate, density and/or viscosity, very accurately, even in the case of inhomogeneous, especially two, or more, phase media, and, indeed, especially desirably with a measurement error of less than 10% referenced to the actual value of the measured quantity. A further object is to provide a corresponding method for producing a corresponding measured value.

For achieving this object, the invention resides in a method for measuring a physical, measured quantity, particularly a mass flow rate, of a mixture flowing in a pipeline, by means of an inline measuring device, especially a Coriolis mass flow measuring device, including a measurement transducer of the vibration-type, and a measuring device electronics electrically coupled with said measurement transducer, said mixture consisting of at least one majority mixture component and at least one minority mixture component. The method comprises steps of flowing the mixture to be measured through at least one measuring tube of said measurement transducer, with the measuring tube being in communication with the pipeline, feeding an excitation current into an exciter arrangement mechanically coupled with the measuring tube conducting the mixture, for causing the measuring tube to execute mechanical oscillations, and driving said measurement tube to oscillate with at least one instantaneous resonance frequency of an first natural eigenmode, and inducing Coriolis forces within the mixture flowing through said vibrating measurement tube, and sensing vibrations of the measuring tube and producing at least one oscillation measurement signal representing oscillations of the vibrating measuring tube.

According to an aspect of the invention, the method further comprises a step of estimating from the excitation current and from the at least one oscillation measurement signal a Coriolis coupling coefficient. This Coriolis coupling coefficient corresponds with an instantaneous coupling between the first natural eigenmode currently driven by the exciter arrangement and a second natural eigenmode of the measurement tube. In the second eigenmode the measurement tube has an eigenform corresponding with a mode of vibration caused by the Coriolis forces induced in the mixture. Due to a variation of a concentration of at least one of the minority components of the mixture, the Coriolis coupling coefficient varies with time.

Additionally, the invention resides in an inline measuring device, especially a Coriolis mass-flow/density measuring device and/or a viscosity measuring device, for the measurement of at least one physical, measured quantity x, especially a mass flow rate, a density, and/or a viscosity, of a two-phase or a multi-phase mixture, flowing in a pipeline, which inline measuring device comprises a vibratory-type transducer and a measuring device electronics electrically coupled with the vibratory-type transducer. The vibratory-type transducer includes at least one measuring tube inserted into the course of the pipeline, said at least one measuring tube serving for conducting the mixture to be measured, and said at least one measuring tube communicating with the connected pipeline, an exciter arrangement acting on the measuring tube for causing the at least one measuring tube to vibrate, a sensor arrangement for sensing vibrations of the at least one measuring tube and for delivering at least one oscillation measurement signal representing oscillations of the measuring tube, and said measuring device electronics delivering, at least at times, an excitation current driving the exciter arrangement, wherein the inline measuring device is adapted to execute the method according to the invention.

The invention is based on the surprising discovery that, contrary to the "classical bubble theory", density and mass flow errors are not directly coupled. Moreover, investigations have shown that density error and mass flow error seems to be generally independent. A basic idea of the invention consists in tracking the drift of the coupling between the eigenmodes Qf the vibrating tube conducting the mixture to be measured due to variation of the concentrations of the individual mixture components. Moreover, based on a analytical model for the oscillating system formed by the vibrating measuring tube and the mixture volume within the vibrating measuring tube appropriate coupling coefficients may be determined during operation of the inline measuring device. As an result of modelling both, the vibrating measuring tube and the mixture volume within the vibrating measuring tube the inventive model is also able to predict positive errors, which the classical "bubble theory" not does. These effects are in accordance with experimental results. In fact, the model may provide convenient explanations of mass flow and density errors in various situations, especially liquid-gas-mixtures.

Another advantage of the invention is that the dynamical characteristics of the mixture volume within the vibrating measuring tube is taken in account for compensating errors caused by two-phase or multi-phase mixture, especially in case of liquid with entrained gas. Therefore, the correction values to be determined are well reproducible over a large range of application and, also, the forming rules for determining the correction values during measurement operation can be formulated relatively simply. Moreover, these forming rules can be calculated initially with a relatively small effort. A further advantage of the invention is, additionally, to be seen in the fact that, in the case of the inline measuring device of the invention, as compared to a conventional type, especially such as described in WO-A 03/095950, WO-A 03/095949 or U.S. Pat. No. 4,524,610, only in the case of the usually digital, measured value production do slight changes have to be made, these being essentially limited to the firmware, while, both in the case of the vibratory transducer and in the production and preprocessing of the oscillation measurement signals, no, or only slight, changes are required.

Thus, for example, even in the case of two, or more, media, the oscillation measurement signals can be sampled, as before, with a usual sampling ratio of far under 100:1, especially of about 10:1.

BRIEF DESCRIPTION OF THE DRAWINGS

The invention and further advantageous embodiments will now be explained in detail on the basis of examples of embodiments presented in the figures of the drawing. Equal parts are provided in all figures with equal reference characters; when required in the interest of clarity, already mentioned reference characters are omitted in subsequent figures.

FIG. 3 shows, sectioned in a side view, the vibratory transducer of FIG. 2, FIG. 4 shows the vibratory transducer FIG. 2 in a first cross section, FIG. 5 shows the vibratory transducer of FIG. 2 in a second cross section.

DESCRIPTION OF THE PREFERRED EMBODIMENTS

In a first embodiment of the invention, the method further comprises at least one of the steps of determining a natural resonance frequency of a fluid resonator formed by the mixture volume within the vibrating measuring tube, and determining a quality factor for vibrations of said fluid resonator. According to an aspect of said embodiment of the invention, the method further comprises a step of generating a quality factor value representing said quality factor for vibrations of said fluid resonator actually.

According to an aspect of said embodiment of the invention the natural resonance frequency of said fluid resonator is derived from a sound speed value representing the speed sound of the mixture actually.

According to another aspect of said embodiment of the invention the step of generating the quality factor value is operated iteratively together with a step of generating a concentration value representing a concentration of at least one of said majority and said minority components within the mixture actually.

In a second embodiment of the invention, the method further comprises steps of determining a sound speed of the mixture to be measured and generating a sound speed value representing the speed sound of the mixture actually, and using said sound speed value for estimating said Coriolis coupling coefficient.

In a third embodiment of the invention, the method further comprises steps of determining a void fraction of the mixture to be measured and generating a concentration value representing a concentration of at least one of said majority and said minority components within the mixture actually, and using said concentration value for estimating said Coriolis coupling coefficient.

In a fourth embodiment of the invention, the step of estimating said Coriolis coupling coefficient comprises at least one of the steps of determining an instantaneous driving frequency of the vibrating measuring tube conducting the mixture, determining an instantaneous quality factor of the vibrating measuring tube conducting the mixture to be measured, determining a static pressure of the mixture, determining an apparent density of the mixture, and determining an apparent mass flow of the mixture.

According to an aspect of said embodiment of the invention the quality factor of the vibrating measuring tube conducting the mixture to be measured is derived from said excitation current.

In a fifth embodiment of the invention the physical, measured quantity is a mass flow rate of said at least one majority component of the mixture.

Figure 1:
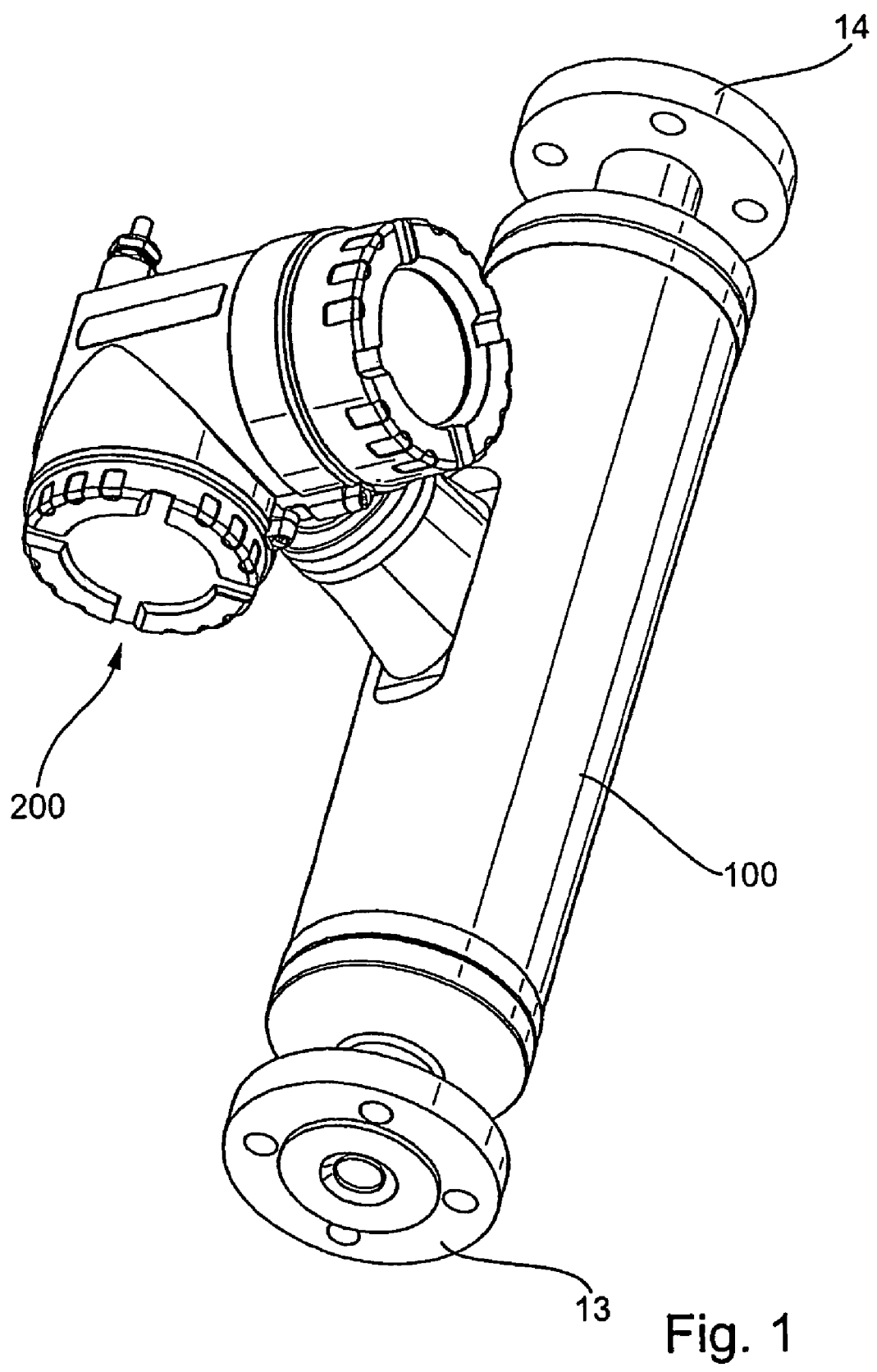
FIG. 1 shows an inline measuring device which can be inserted into a pipeline for measuring a mass flow rate of a fluid guided in the pipeline.

FIG. 1 shows, respectively, an inline measuring device 1 suited for determining a physical, measured quantity, e.g. a mass flow rate, $\dot{m}$, a density, $\rho$, and/or a viscosity, $\eta$, of a medium flowing in a pipeline (not shown) and for imaging this measured quantity in an instantaneously representing, measured value $X_X$, especially a mass flow value $X_m$, a density value $X_\rho$, and a viscosity value $X_\eta$, respectively. The medium in this instance can be practically any flowable substance, for example a liquid-gas mixture, an aerosol, a vapor, or the like.

Figure 2:
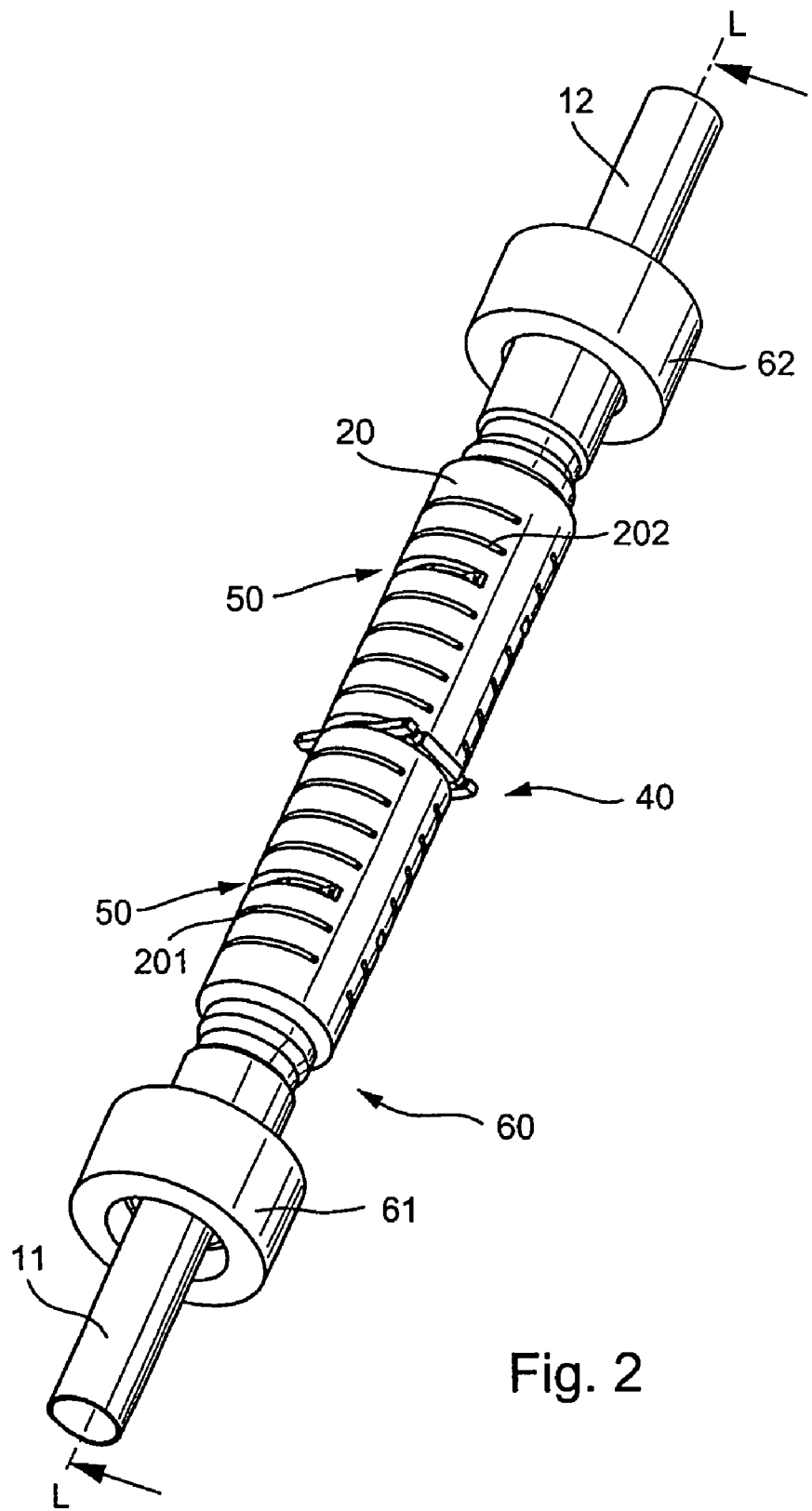
FIG. 2 shows, in a perspective, side view, an example of an embodiment for a measurement transducer of the vibratory-type suited for the measuring device of FIG. 1.
Figure 6:
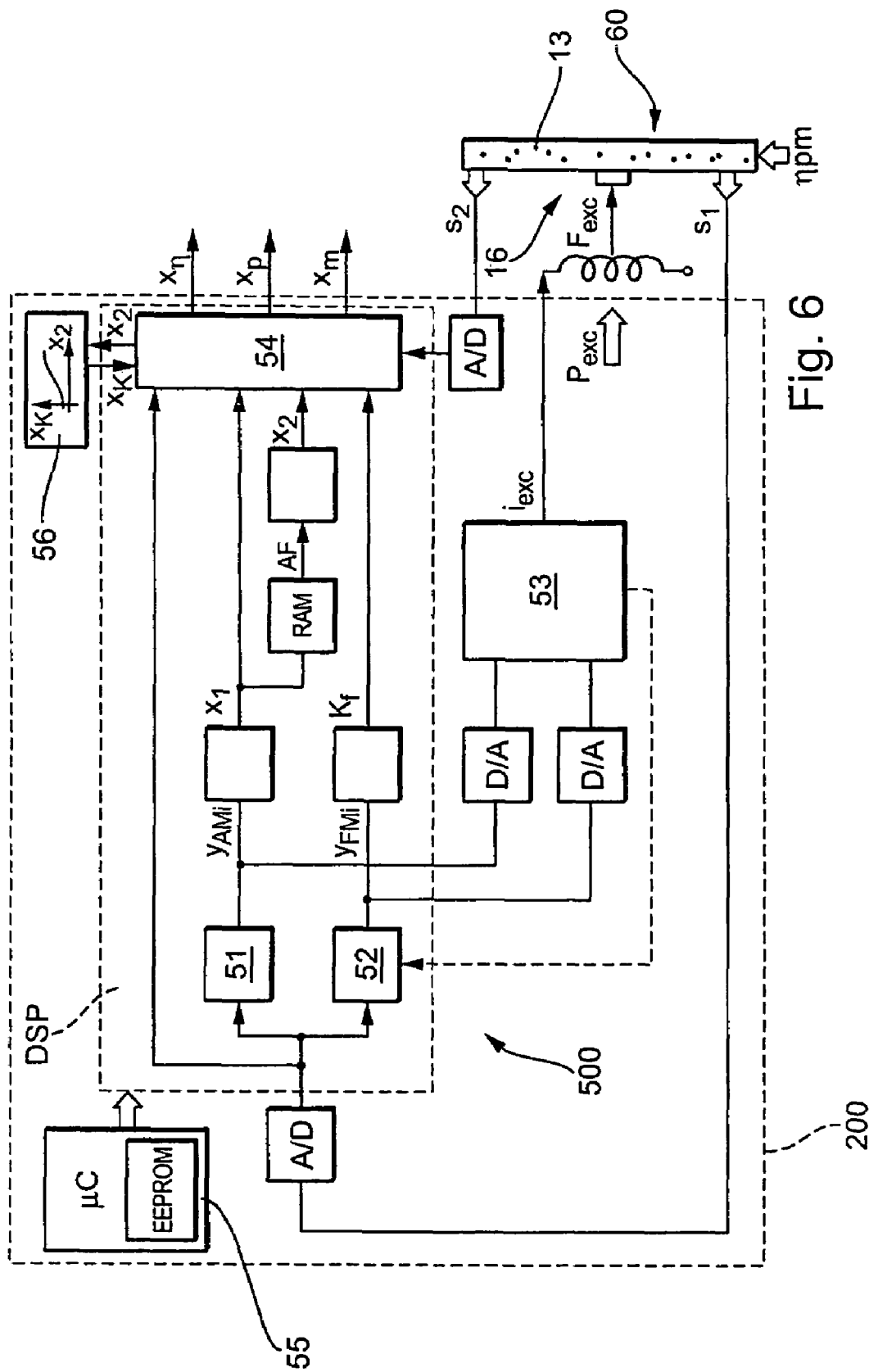
FIG. 6 shows schematically in the form of a block diagram a embodiment of a measuring device electronics suited for the inline measuring device of FIG. 1.
Figure 7:
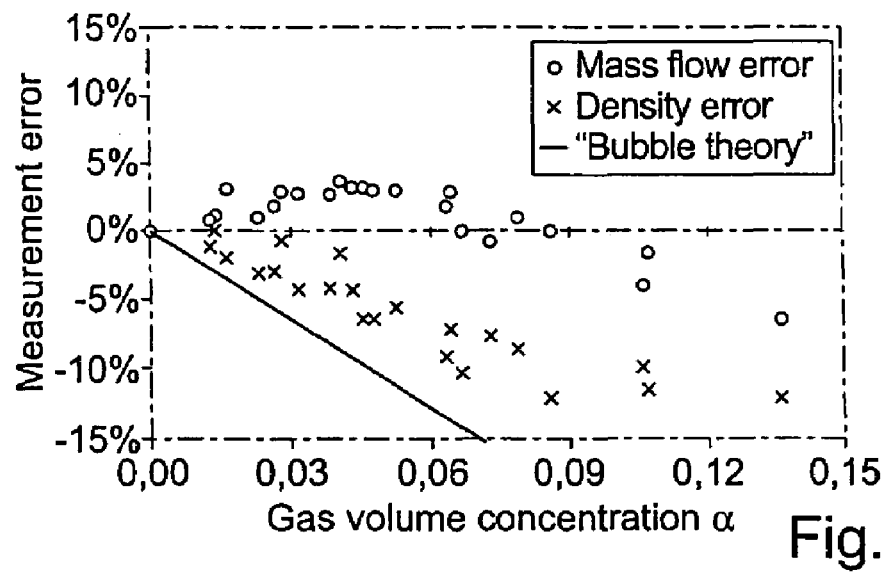
FIG. 7 shows measurement errors on gas concentration.

The inline measuring device 1, for example provided in the form of a Coriolis mass flow, density and/or viscosity meter, includes therefor a vibratory transducer 10 flowed-through by the medium to be measured, an example of an embodiment and developments being shown in FIGS. 2 to 6, together with a measuring device electronics 500, as illustrated schematically in FIGS. 2 and 7. Further, the measuring device electronics 500 may, additionally, so designed that it can, during operation of the inline measuring device 1, exchange measurement and/or operational data with a measured value processing unit superordinated, i.e. located at a higher level, with respect thereto, for example a programmable logic controller (PLC), a personal computer and/or a workstation, via a data transmission system, for example a field bus system. Furthermore, the measuring device electronics is designed such that it can be supplied from an external energy supply, for example also over the aforementioned field bus system. For the case in which the vibratory measuring device is provided for coupling to a field bus or some other communication system, the, especially programmable, measuring device electronics 500 is equipped with a corresponding communications interface for a communication of data, e.g. for the transmission of the measurement data to the already mentioned, programmable logic controller or to a superordinated process control system. For accommodation of the measuring device electronics 500, an electronics housing 200 is additionally provided, especially one mounted externally directly onto the vibratory transducer 10, but even one possibly set apart from such.

As already mentioned, the inline measuring device includes a vibratory transducer, which is flowed-through by the medium to be measured, and which serves for producing, in a through-flowing medium, mechanical reaction forces, especially Coriolis forces, dependent on the mass flow rate, inertial forces dependent on the density of the medium and/or frictional forces dependent on the viscosity of the medium, forces which react measurably, i.e. capable of being detected by sensor, on the vibratory transducer. Derived from these reaction forces characterizing the medium, e.g. the mass flow rate, the density and/or the viscosity of the medium can be measured in manner known to those skilled in the art. In FIGS. 3 and 4, an example of an embodiment of an electrophysical transducer arrangement, serving as a vibratory transducer 10, is schematically illustrated. The mechanical construction and manner of functioning of such a transducer arrangement is known per se to those skilled in the art and is also described in detail in U.S. Pat. No. 6,691,583, WO-A 03/095949 or WO-A 03/095950.

For guiding the medium and for producing said reaction forces, the vibratory transducer includes at least one measuring tube 10 of predeterminable measuring tube diameter. The at least one measuring tube 10 may be a curved tube or, as shown in FIGS. 3 and 4, an essentially straight tube. Anyway, during operation the tube 10 is caused to vibrate, at least at times, and is repeatedly elastically deformed thereby. Elastic deformation of the measuring tube lumen means here, that a spatial form and/or a spatial position of the measuring tube lumen is changed within an elastic range of the measuring tube 10 in predeterminable manner cyclically, especially periodically; compare, in this connection, also U.S. Pat. No. 4,801,897, U.S. Pat. No. 5,648,616, U.S. Pat. No. 5,796,011, U.S. Pat. No. 6,006,609, U.S. Pat. No. 6,691,583, WO-A 03/095949 and/or WO-A 03/095950. It should be mentioned here that, instead of the vibratory transducer shown in the example of an embodiment having a single, straight measuring tube, the vibratory transducer serving for implementation of the invention can, as well, be selected from a multiplicity of vibratory transducers known in the state of the art. In particular, suited, for example, are vibratory transducers having two parallel, straight measuring tubes flowed-through by the medium to be measured, such as are described in detail also in U.S. Pat. No. 5,602,345.

As shown in FIG. 1, the vibratory transducer 1 additionally has a vibratory transducer housing 100 surrounding the measuring tube 10, as well as surrounding possible other components of the vibratory transducer (see also further below). Housing 100 acts to protect tube 10 and other components from damaging environmental influences and/or to damp possible outwardly-directed sound emissions of the vibratory transducer. Beyond this, the vibratory transducer housing 100 also serves as a mounting platform for an electronics housing 200 housing the measuring device electronics 500. To this end, the vibratory transducer housing 100 is provided with a neck-like transition piece, on which the electronics housing 200 is appropriately fixed; compare FIG. 1. Instead of the tube-shaped transducer housing 100 shown here extending coaxially with the measuring tube, other suitable housing forms can, of course, be used, such as e.g. box-shaped structures.

The measuring tube 10, which communicates in the usual manner at inlet and outlet ends with the pipeline introducing, respectively extracting, the medium to be measured, is oscillatably suspended in the preferably rigid, especially bending- and twisting-stiff, transducer housing 100. For permitting the medium to flow through, the measuring tube is connected to the pipeline via an inlet tube piece 11 opening into the inlet end 11# and an outlet tube piece 12 opening into the outlet end 12#. Measuring tube 10, inlet tube piece 11 and outlet tube piece 12 are aligned with one another and with the above-mentioned measuring tube longitudinal axis L as exactly as possible and are, advantageously, provided as one piece, so that e.g. a single, tubular stock can serve for their manufacture; in case required, measuring tube 10 and tube pieces 11, 12 can, however, also be manufactured by means of separate, subsequently joined, e.g. welded, stock. For manufacture of the measuring tube 10, as well as the inlet and outlet, tubular pieces 11, 12, practically every usual material for such vibratory transducers can be used, such as e.g. alloys of iron, titanium, zirconium and/or tantalum, synthetic materials, or ceramics. For the case where the vibratory transducer is to be releasably assembled with the pipeline, first and second flanges 13, 14 are preferably formed on the inlet tube piece 11 and the outlet tube piece 12, respectively; if required, the inlet and outlet tube pieces can, however, also be connected directly to the pipeline, e.g. by means of welding or brazing. Additionally, as shown schematically in FIG. 1, the transducer housing 100 is provided, fixed to the inlet and outlet tube pieces 11, 12, for accommodating the measuring tube 10; compare, in this connection, FIGS. 1 and 2.

At least for measuring the mass flow rate m, the measuring tube 10 is excited in a first useful mode of oscillation developed as a lateral oscillation mode, in which it executes, at least in part, oscillations, especially bending oscillations, laterally to an imaginary measuring tube longitudinal axis L, especially such that it bends laterally outwards, essentially oscillating at a natural bending eigenfrequency, according to a natural, first form of eigenoscillation. For the case where the medium is flowing in the connected pipeline and, consequently, the mass flow rate m is different from zero, the measuring tube 10, oscillating in the first useful mode of oscillation, induces Coriolis forces in the medium as it flows through. These, in turn, interact with the measuring tube 10 and result, in the manner known to those skilled in the art, in an additional, sensor-detectable deformation of the measuring tube 10 essentially according to a natural, second form of eigenoscillation coplanarly superimposed on the first form of eigenoscillation. The instantaneous shape of the deformation of the measuring tube 10 is, in such case, especially as regards its amplitudes, also dependent on the instantaneous mass flow rate m. As usual in the case of such vibratory transducers, anti-symmetric forms of bending oscillation of two, or four, antinodes can e.g. serve as the second form of eigenoscillation, the so-called Coriolis mode. Since natural eigenfrequencies of such modes of lateral oscillation of measuring tubes are known to depend, in special measure, also on the density $\rho$ of the medium, also the density $\rho$ can be measured, without more, by means of the inline measuring device, in addition to the mass flow rate m. In addition to the lateral oscillations, the at least one measuring 10 is also driven, at least at times, in a torsional mode of oscillation, for producing viscosity-dependent, shear forces in the flowing medium. In this torsional mode of oscillation, the measuring tube is excited to torsional oscillations about an axis of torsional oscillation extending essentially parallel to, or coinciding with, the longitudinal axis L of the measuring tube. Essentially, this excitement is such that the measuring tube 10 is twisted about its longitudinal axis L in a form of natural, torsional oscillation; compare, in this connection, e.g. also U.S. Pat. No. 4,524,610, U.S. Pat. No. 5,253,533, U.S. Pat. No. 6,006,609 or EP-A 1 158 289. The exciting of said torsional oscillations can, in such case, occur either in alternation with the first useful mode of oscillation and separated therefrom, in a second useful mode of oscillation, or, at least in the case of mutually distinguishable oscillation frequencies, also simultaneously with the lateral oscillations in the first useful mode of oscillation. Stated differently, the vibratory transducer works, at least at times, in a dual-mode of operation, in which the at least one measuring tube 10 is caused to vibrate alternatingly in at least two oscillation modes essentially independent of one another, namely in the lateral oscillation mode and in the torsional oscillation mode.

According to one embodiment of the invention, for producing the mass flow rate-dependent Coriolis forces in the flowing medium, the measuring tube 10 is excited, at least at times, with a lateral oscillation frequency, which corresponds as exactly as possible to a lowest natural bending eigenfrequency of the measuring tube 10, so that, thus, the laterally oscillating measuring tube 10, without fluid flowing through it, is essentially symmetrically bowed outwards with respect to a middle axis perpendicular to the longitudinal axis L of the measuring tube and, in doing so, exhibits a single oscillation antinode. This lowest bending eigenfrequency can be, for example, in the case of a stainless steel tube serving as the measuring tube 10, of nominal diameter 20 mm, wall thickness about 1.2 mm and length about 350 mm, with the usual appendages, about 850 Hz to 900 Hz.

In a further embodiment of the invention, the measuring tube 10 is excited, especially simultaneously to the lateral oscillations in the useful mode, with a torsional oscillation frequency $f_{excT}$, which corresponds as exactly as possible to a natural torsional eigenfrequency of the measuring tube. A lowest torsional eigenfrequency can, for example, lie in the case of a straight measuring tube about in the range of twice the lowest bending eigenfrequency.

As already mentioned, the oscillations of the measuring tube 11 are damped, on the one hand, by transfer of oscillation energy, especially to the medium. On the other hand, however, oscillation energy can also be withdrawn from the vibrating measuring tube to a considerable degree by the excitation of components mechanically coupled therewith into oscillations, components such as e.g. the transducer housing 100 or the connected pipeline. For the purpose of suppressing or preventing a possible loss of oscillation energy to the environment, a counteroscillator 20 is, therefore, provided in the vibratory transducer fixed to the inlet and outlet ends of the measuring tube 10. The counteroscillator 20 is, as shown schematically in FIG. 2, preferably embodied as one piece. If required, the counteroscillator 20 can be composed of multiple parts, as shown e.g. also in U.S. Pat. No. 5,969,265, EP-A 317 340 or WO-A 00/14485, or it can be implemented by means of two separate counteroscillator portions fixed to the inlet and outlet ends of the measuring tube 10. The counteroscillator 20 serves, among other things, to balance the vibratory transducer dynamically for at least one, predetermined density value of the medium, for example a density value most frequently to be expected, or also a critical density value, to such an extent that transverse forces and/or bending moments possibly produced in the vibrating measuring tube 10 are largely compensated; compare, in this connection, also U.S. Pat. No. 6,691,583. Moreover, the counteroscillator 20 serves for the above-described case, where the measuring tube 10 is also excited during operation to torsional oscillations, additionally to produce counter torsional moments largely compensating such torsional moments as are produced by the single measuring tube 10 preferably twisting about its longitudinal axis L, thus holding the environment of the vibratory transducer, especially, however, the connected pipeline, largely free of dynamic torsional moments. The counteroscillator 20 can, as shown schematically in FIGS. 2 and 3, be embodied in tube shape and can be connected, for example, to the inlet end 11# and the outlet end 12# of the measuring tube 10 in such a manner that it is, as shown in FIG. 3, arranged essentially coaxially with the measuring tube 10. The counteroscillator 20 can be made of practically any of the materials also used for the measuring tube 10, thus, for example, stainless steel, titanium alloys, etc.

The counteroscillator 20, which is, especially in comparison to the measuring tube 10, somewhat less torsionally and/or bendingly elastic, is likewise caused to oscillate during operation and, indeed, with essentially the same frequency as the measuring tube 10, but out of phase therewith, especially with opposite phase. To this end, the counteroscillator 20 is caused to oscillate with at least one of its torsional eigenfrequencies tuned as accurately as possible to those torsional oscillation frequencies, with which the measuring tube is predominantly caused to oscillate during operation. Moreover, the counteroscillator 20 is adjusted also in at least one of its bending eigenfrequencies to at least one bending oscillation frequency with which the measuring tube 10, especially in the useful mode, is caused to oscillate, and the counteroscillator 20 is excited during operation of the vibratory transducer also to lateral oscillations, especially bending oscillations, which are developed essentially coplanarly with lateral oscillations of the measuring tube 10, especially the bending oscillations of the useful mode.

In an embodiment of the invention shown schematically in FIG. 3, the counteroscillator 20 has, for this purpose, grooves 201, 202, which make possible an exact adjustment of its torsional eigenfrequencies, especially a sinking of the torsional eigenfrequencies through a sinking of a torsional stiffness of the counteroscillator 20. Although the grooves 201, 202 are shown in FIG. 2 or FIG. 3 essentially uniformly distributed in the direction of the longitudinal axis L, they can, if required, also be arranged, without more, distributed non-uniformly in the direction of the longitudinal axis L. Moreover, the mass distribution of the counteroscillator can, as likewise shown schematically in FIG. 3, also be corrected by means of corresponding mass balancing bodies 101, 102 fixed to the measuring tube 10. These mass balancing bodies 101, 102 can be e.g. metal rings pushed onto the measuring tube 10, or small metal plates fixed thereto.

For producing mechanical oscillations of the measuring tube 10, the vibratory transducer additionally includes an exciter arrangement 40, especially an electrodynamic one, coupled to the measuring tube. The exciter arrangement 40 serves for converting an electrical exciter power $P_{exc}$ fed from the measuring device electronics, e.g. having a regulated excitation current $i_{exc}$ and/or a regulated voltage, into an e.g. pulse-shaped, or harmonic, exciter moment $M_{exc}$ and/or an exciter force $F_{exc}$ acting on, and elastically deforming, the measuring tube 10. For achieving a highest possible efficiency and a highest possible signal/noise ratio, the exciter power $P_{exc}$ is tuned as exactly as possible such that predominantly the oscillations of the measuring tube 10 in the useful mode are maintained, and, indeed, as accurately as possible to an instantaneous eigenfrequency of the measuring tube containing the medium flowing therethrough. The exciter force $F_{exc}$, as well as also the exciter moment $M_{exc}$, can, in this case, as is shown schematically in FIG. 4, each be developed bidirectionally or, however, also unidirectionally, and can be adjusted in the manner known to those skilled in the art, e.g. by means of a current and/or voltage regulating circuit as regards their amplitude and e.g. by means of a phase locked loop as regards their frequency. The exciter arrangement 40 can include, as usual in the case of such vibratory measurement-pickups, for instance a plunger coil arrangement having a cylindrical exciter coil attached to the counteroscillator 20 or to the inside of the transducer housing 100. In operation, the exciter coil has a corresponding excitation current $i_{exc}$ flowing through it. Additionally included in the exciter arrangement 40 is a permanently magnetic armature extending at least partially into the exciter coil and fixed to the measuring tube 10. Furthermore, the exciter arrangement 40 can also be realized by means of a plurality of plunger coils, or also by means of electromagnets, such as e.g. shown in U.S. Pat. No. 4,524,610 or WO-A 03/095950.

For detecting the oscillations of the measuring tube 10, the vibratory transducer additionally includes a sensor arrangement 50, which produces, as a representation of vibrations of the measuring tube 10, a first, especially analog, oscillation measurement signal $s_1$ by means of a first oscillation sensor 51 reacting to such vibrations. The oscillation sensor 51 can be formed by means of a permanently magnetic armature, which is fixed to the measuring tube 10 and interacts with a sensor coil mounted on the counteroscillator 20 or the transducer housing. To serve as the oscillation sensor 51, especially such sensors are suited, which detect a velocity of the deflections of the measuring tube 10, based on the electrodynamic principle. However, also acceleration measuring, electrodynamic or even travel-distance measuring, resistive or optical sensors can be used. Of course, other sensors known to those skilled in the art as suitable for detection of such vibrations can be used. The sensor arrangement 60 includes, additionally, a second oscillation sensor 52, especially one identical to the first oscillation sensor 51. The second sensor 52 provides a second oscillation measurement signal $s_2$ likewise representing vibrations of the measuring tube 10. The two oscillation sensors 51, 52 are in this embodiment so arranged in the vibratory transducer, separated from one another along the length of the measuring tube 10, especially at equal distances from the halfway point of the measuring tube 10, that the sensor arrangement 50 locally registers both inlet-end and outlet-end vibrations of the measuring tube 10 and converts them into the corresponding oscillation measurement signals $s_1$, $s_2$. The two oscillation measurement signals $s_1$, $s_2$, which usually each exhibit a signal frequency corresponding to an instantaneous oscillation frequency of the measuring tube 10, are, as shown in FIG. 2, fed to the measuring device electronics 500, where they are preprocessed, especially digitized, and then suitably evaluated by means of corresponding components.

According to an embodiment of the invention, the exciter arrangement 40 is, as, in fact, shown in FIGS. 2 and 3, so constructed and arranged in the vibratory transducer, that it acts, during operation, simultaneously, especially differently, on the measuring tube 10 and on the counteroscillator 20. In the case of this further development of the invention, the exciter arrangement 40 is, as, in fact, shown in FIG. 2, advantageously so constructed and so arranged in the vibratory transducer, that it acts, during operation, simultaneously, especially differentially, on the measuring tube 10 and on the counteroscillator 20. In the example of an embodiment shown in FIG. 4, the exciter arrangement 40 has, for such purpose, at least one first exciter coil 41a, through which the excitation current, or an excitation current component, flows at least at times during operation. The first exciter coil 41a is fixed to a lever 41c connected to the measuring tube 10 and acts differentially on the measuring tube 10 and the counteroscillator 20 via this lever and an armature 41b fixed externally to the counteroscillator 20. This arrangement has, among others, the advantage that, on the one hand, the counteroscillator 20, and thus also the transducer housing 100, is kept small in cross section and, in spite of this, the first exciter coil 41a is easily accessible, especially also during assembly. Moreover, a further advantage of this embodiment of the exciter arrangement 40 is that possible used coil cups 41d, which especially at nominal diameters of over 80 mm, have weights which can no longer be ignored, are fixable on the counteroscillator 20 and, consequently, have practically no influence on the eigenfrequencies of the measuring tube 10. It is to be noted here, however, that, in case required, the first exciter coil 41a can be held by the counteroscillator 20 and the armature 41b, then, by the measuring tube 10.

In corresponding manner, the oscillation sensors 51, 52 can be so designed and arranged in the vibratory transducer that the vibrations of the measuring tube 10 and the counteroscillator 20 are registered differentially by them. In the example of an embodiment shown in FIG. 5, the sensor arrangement 50 includes a sensor coil 51a fixed to the measuring tube 10, here outside of all principal axes of inertia of the sensor arrangement 50. The sensor coil 51a is arranged as close as possible to an armature 51b fixed to the counteroscillator 20 and magnetically so coupled with such, that a changing measurement voltage is induced in the sensor coil, influenced by rotary and/or lateral, relative movements between measuring tube 10 and counteroscillator 20 in changing their relative position and/or their relative separation. On the basis of such an arrangement of the sensor coil 51a, both the above-mentioned torsional oscillations and the excited bending oscillations can, advantageously, be registered simultaneously. If necessary, the sensor coil 51a therefor can, however, also be fixed to the counteroscillator 20 and the armature 51b coupled therewith can, correspondingly, then be fixed to the measuring tube 10.

In another embodiment of the invention, measuring tube 10, counteroscillator 20 and the sensor and exciter arrangements 40, 50 secured thereto are so matched to one another with respect to their mass distribution, that the resulting inner part of the vibratory transducer, suspended by means of the inlet and outlet tube pieces 11, 12, has a center of mass MS lying at least inside of the measuring tube 10, and preferably as close as possible to the longitudinal axis L of the measuring tube. Additionally, the inner part is advantageously so constructed that it has a first principal axis of inertia $T_1$ aligned with the inlet tube piece 11 and the outlet tube piece 12 and lying at least sectionally within the measuring tube 10. Due to the displacement of the center of mass MS of the inner part, especially, however, also due to the above-described position of the first principal axis of inertia $T_1$, the two oscillation forms assumed in operation by the measuring tube 10 and largely compensated by the counteroscillator 20, namely the torsional oscillations and the bending oscillations of the measuring tube 10, are highly mechanically decoupled from one another; compare, in this connection, also WO-A 03/095950. In this way, the two forms of oscillation, thus lateral oscillations and/or torsional oscillations, are advantageously, without more, excited separately from one another. Both the displacement of the center of mass MS and also the first principal axis of inertia $T_1$ toward the longitudinal axis of the measuring tube can, for example, be considerably simplified by having the inner part, thus measuring tube 10, counteroscillator 20 and the sensor and exciter arrangements 50, 40 secured thereto, so constructed and arranged with respect to one another, that a mass distribution of the inner part along the length of the measuring tube longitudinal axis L is essentially symmetrical, at least, however, invariant relative to an imaginary rotation about the longitudinal axis L of the measuring tube by 180° (c2-symmetry). Additionally, the counteroscillator 20—here tubularly, especially also largely axially symmetrically, embodied—is arranged essentially coaxially with the measuring tube 10, whereby the reaching of a symmetrical distribution of mass in the inner part is significantly simplified, and, consequently, also the center of mass MS is displaced in simple manner close to the longitudinal axis L of the measuring tube. Moreover, the sensor and exciter arrangements 50, 40 in the example of an embodiment presented here are so constructed and arranged relative to one another on the measuring tube 10 and, where appropriate, on the counteroscillator 20, that a mass moment of inertia produced by them is developed as concentrically as possible to the longitudinal axis L of the measuring tube or at least is kept as small as possible. This can e.g. be achieved by having a common center of mass of sensor and exciter arrangements 50, 40 lie as close as possible to the longitudinal axis L of the measuring tube and/or by keeping the total mass of sensor and exciter arrangements 50, 40 as small as possible.

In a further embodiment of the invention, the exciter arrangement 40 is, for the purpose of the separated exciting of torsional and/or bending oscillations of the measuring tube 10, so constructed and so fixed to the measuring tube 10 and to the counteroscillator 20, that a force producing the bending oscillations acts on the measuring tube 10 in the direction of an imaginary line of force extending outside of a second principal axis of inertia $T_2$ perpendicular to the first principal axis of inertia $T_1$, or intersecting the second principal axis of inertia in, at most, one point. Preferably, the inner part is so embodied that the second principal axis of inertia $T_2$ is essentially the above-mentioned middle axis. In the example of an embodiment shown in FIG. 4, the exciter arrangement 40 has, for this purpose, at least one first exciter coil 41a, through which the excitation current or an excitation current component flows at least at times during operation. Exciter coil 41a is fixed to a lever 41c connected with the measuring tube 10 and via this lever and an armature 41b fixed externally to the counteroscillator 20, acts differentially on the measuring tube 10 and the counteroscillator 20. This arrangement has, among other things, also the advantage that, on the one hand, the counteroscillator 20 and, consequently, also the transducer housing 100 are kept small in cross section and, in spite of this, the exciter coil 41a is easily accessible, especially also during assembly. Moreover, a further advantage of this embodiment of the exciter arrangement 40 is that possibly used coil cups 41d, which especially at nominal diameters of over 80 mm have weights that no longer can be neglected, can likewise be fixed to the counteroscillator 20 and, consequently, have practically no effect on the resonance frequencies of the measuring tube. It should be noted here that, when required, the exciter coil 41a can also be mounted to the counteroscillator 20 and then the armature 41b is held by the measuring tube 10.

According to a further embodiment of the invention, the exciter arrangement 40 has at least one, second exciter coil 42a arranged along a diameter of the measuring tube 10 and coupled with the measuring tube 10 and the counteroscillator 20 in the same way as the exciter coil 41a. According to another, preferred embodiment of the invention, the exciter arrangement has two further exciter coils 43a, 44a, thus a total of four, at least arranged symmetrically with respect to the second principal axis of inertia $T_2$. All coils are mounted in the vibratory transducer in the above-described manner. The force acting on the measuring tube 10 outside of the second principal axis of inertia $T_2$ can be produced by means of such two, or four, coil arrangements in simple manner e.g. by having one of the exciter coils, e.g. the exciter coil 41a, exhibit another inductance than the respective others, or by causing to flow through one of the exciter coils, e.g. the exciter coil 41a, during operation, an excitation current component that is different from a respective excitation current component of the respectively other exciter coils.

According to another embodiment of the invention, the sensor arrangement 50 includes, as shown schematically in FIG. 5, a sensor coil 51a arranged outside of the second principal axis of inertia $T_2$ and fixed to measuring tube 10. The sensor coil 51a is arranged as near as possible to an armature 51b fixed to the counteroscillator 20 and is magnetically coupled therewith such that a changing measurement voltage is induced in the sensor coil, influenced by rotary and/or lateral relative movements between measuring tube 10 and counteroscillator 20 as they change their relative positions and/or their relative separations. Due to the arrangement of the sensor coil 51a according to the invention, both the above-described torsional oscillations and the bending oscillations, excited where appropriate, can be registered in advantageous manner simultaneously. If required, the sensor coil 51a therefor can, instead, be fixed to the counteroscillator 20 and, in corresponding manner, the armature 51b coupled therewith can be fixed to the measuring tube 10.

It is noted here, additionally, that the exciter arrangement 40 and the sensor arrangement 50 can also have, in the manner known to those skilled in the art, essentially the same mechanical structure; consequently, the above-described embodiments of the mechanical structure of the exciter arrangement 40 can essentially also be transferred to the mechanical structure of the sensor arrangement 50, and vice versa.

For vibrating the measuring tube 10, the exciter arrangement 40 is, as already mentioned, fed with a likewise oscillating excitation current iexc, especially a multifrequency current, of adjustable amplitude and adjustable exciter frequency $f_{exc}$ such that this current flows through the exciter coils 26, 36 during operation and the magnetic fields required for moving the armatures 27, 37 are produced in corresponding manner. The excitation current $i_{exc}$ can be e.g. harmonically multifrequent or even rectangular. The lateral oscillation exciter frequency $f_{excL}$ of a lateral current component $i_{excL}$ of the excitation current $i_{exc}$ required for maintaining the lateral oscillations of the measuring tube 10 can advantageously be so chosen and adjusted in the case of the vibratory transducer shown in the example of an embodiment that the laterally oscillating measuring tube 10 oscillates essentially in a bending oscillation base mode having a single oscillation antinode. Analogously thereto, also a torsional oscillation frequency $f_{excT}$ of a torsional current component $i_{excT}$ of the excitation current $i_{exc}$ required for maintaining the torsional oscillations of the measuring tube 10 can advantageously be so chosen and adjusted in the case of the vibratory transducer shown in the example of an embodiment that the torsionally oscillating measuring tube 10 oscillates essentially in a torsional oscillation base mode having a single oscillation antinode. The two mentioned current components $i_{excL}$ and $i_{excT}$ can, depending on the type of operation selected, be fed into the exciter arrangement 40 intermittently, thus instantaneously each acting as the excitation current $i_{exc}$, or also simultaneously, thus supplementing one another to form the effective excitation current $i_{exc}$.

For the above-described case wherein the lateral oscillation frequency $f_{excL}$ and the torsional oscillation frequency $f_{excT}$, with which the measuring the measuring tube 10 is caused to oscillate during operation, are adjusted differently from one another, a separation of the individual oscillation modes can occur both in the exciter signals and also in the sensor signals, by means of the vibratory transducer in simple and advantageous manner, even in the case of simultaneously excited torsional and bending oscillations, e.g. based on a signal filtering or a frequency analysis. Otherwise, an alternating exciting of the lateral and torsional oscillations recommends itself.

For producing and adjusting the excitation current $i_{exc}$, or the current components $i_{excL}$, $i_{excT}$, the measuring device electronics includes a corresponding driver circuit 53, which is controlled by a lateral oscillation frequency adjustment signal $y_{FML}$ representing the desired lateral oscillation exciter frequency $f_{excL}$ and by a lateral oscillation amplitude adjustment signal $y_{AML}$ representing the desired lateral oscillation amplitude of the excitation current $i_{exc}$ and/or the lateral current component $i_{excL}$, as well as, at least at times, by a torsional oscillation frequency adjustment signal $y_{FMT}$ representing the torsional oscillation exciter frequency $f_{excT}$ and by a torsional oscillation amplitude adjustment signal $y_{AMT}$ representing the desired torsional oscillation amplitude of the excitation current $i_{exc}$ and/or the torsional current component $i_{excT}$. The driver circuit 53 can be realized e.g. by means of a voltage-controlled oscillator or a downstream voltage-to-current converter; instead of an analog oscillator, however, also a numerically controlled, digital oscillator can be used to set the instantaneous excitation current $i_{exc}$ or the components $i_{excL}$, $i_{excT}$ of the excitation current.

An amplitude control circuit 51 integrated into the measuring device electronics 500 can serve for producing the lateral amplitude adjustment signal $y_{AML}$ and/or the torsional oscillation amplitude adjustment signal $y_{AMT}$. The amplitude control circuit 51 actualizes the amplitude adjustment signals $y_{AML}$, $y_{AMT}$ on the basis of instantaneous amplitudes of at least one of the two oscillation measurement signals $s_1$, $s_2$ measured at the instantaneous lateral oscillation frequency and/or the instantaneous torsional oscillation frequency, as well as on the basis of corresponding, constant or variable amplitude reference values for the lateral and torsional oscillations, respectively $W_B$, $W_T$; as appropriate, also instantaneous amplitudes of the excitation current $i_{exc}$ can be referenced for generating the lateral oscillation amplitude adjustment signal $y_{AML}$ and/or the torsional oscillation amplitude adjustment signal $y_{AMT}$; compare FIG. 6. Construction and manner of operation of such amplitude control circuits are likewise known to those skilled in the art. As an example for such an amplitude control circuit, reference is made, moreover, to the measurement transmitters of the series "PROMASS 80", such as are available from the assignee, for example in connection with vibratory transducers of the series "PROMASS I". Their amplitude control circuit is preferably so constructed that the lateral oscillations of the measuring tube 10 are controlled to a constant amplitude, thus an amplitude also independent of the density ρ.

The frequency control circuit 52 and the driver circuit 53 can be constructed e.g. as phase-locked loops, which are used in the manner known to those skilled in the art for adjusting the lateral oscillation frequency adjusting signal $y_{FML}$ and/or the torsional oscillation frequency adjusting signal YFMT continuously for the instantaneous eigenfrequencies of the measuring tube 10 on the basis of a phase difference measured between at least one of the oscillation measurement signals $s_1$, $s_2$ and the excitation current $i_{exc}$ to be adjusted, respectively the instantaneously measured excitation current $i_{exc}$. The construction and use of such phase-locked loops for the driving of measuring tubes at one of their mechanical eigenfrequencies is described in detail in e.g. U.S. Pat. No. 4,801,897. Of course, other frequency control circuits known to those skilled in the art can be used, such as are proposed in U.S. Pat. No. 4,524,610 or U.S. Pat. No. 4,801,897. Furthermore, reference is made to the already mentioned measurement transmitters of the series "PROMASS 80" respecting a use of such frequency control circuits for vibratory transducers. Other circuits suitable for use as driver circuits can be learned from, for example, U.S. Pat. No. 5,869,770 or U.S. Pat. No. 6,505,519.

According to a further embodiment of the invention, the amplitude control circuit 51 and the frequency control circuit 52 are, as shown schematically in FIG. 6, realized by means of a digital signal processor DSP provided in the measuring device electronics 500 and by means of program code correspondingly implemented in such and running therein. The program codes can be stored persistently or even permanently e.g. in a non-volatile memory EEPROM of a microcomputer 55 controlling and/or monitoring the signal processor and loaded upon startup of the signal processor DSP into a volatile data memory RAM of the measuring device electronics 500, e.g. RAM integrated in the signal processor DSP. Signal processors suited for such applications are e.g. those of type TMS320VC33 available from the firm Texas Instruments Inc. It is clear, in this regard, that the oscillation measurement signals $s_1$, $s_2$ need to be converted by means of corresponding analog-to-digital converters A/D into corresponding digital signals for a processing in the signal processor DSP; compare, in this connection, especially EP-A 866,319. In case required, adjustment signals output from the signal processor, such as e.g. the amplitude adjusting signals $y_{AML}$, $y_{AMT}$, or the frequency adjusting signals $y_{FML}$, $y_{FMT}$, can be, in corresponding manner, converted from digital to analog.

As shown in FIG. 6, the, if appropriate, first suitably conditioned, oscillation measurement signals $s_1$, $s_2$ are additionally sent to a measurement circuit 21 of the measuring device electronics for producing the at least one measured value $X_X$ on the basis of at least one of the oscillation measurement signals $s_1$, $s_2$ and/or on the basis of the excitation current $i_{exc}$.

According to an embodiment of the invention, the measurement circuit 21 is constructed, at least in part, as a flow rate calculator and the measurement circuit serves for determining, in the manner known per se to those skilled in the art, from a phase difference detected between the oscillation measurement signals $s_1$, $s_2$ generated in the case of a measuring tube 10 oscillating laterally at least in part, a measured value $X_X$ serving here as a mass flow rate measured value and representing, as accurately as possible, the mass flow rate to be measured. The measurement circuit 21 can be any, especially digital, measuring circuit already used in conventional Coriolis mass flow measuring devices for determining the mass flow rate on the basis of the oscillation measurement signals $s_1$, $s_2$; compare, in this connection, especially the initially mentioned WO-A 02/37063, WO-A 99/39164, U.S. Pat. No. 5,648,616, U.S. Pat. No. 5,069,074. Of course, other measuring circuits known to those skilled in the art to be suitable for Coriolis mass flow measuring devices can be used, i.e. measuring circuits which measure, and correspondingly evaluate, phase and/or time differences between oscillation measurement signals of the described kind.

Additionally, the measurement circuit 21 can also serve to utilize an oscillation frequency of the at least one measuring tube 11, as measured, for example, on the basis of at least one of the oscillation measurement signals $s_1$, $s_2$, for generating a measured value $X_X$ usable as a density measured value instantaneously representing a density ρ to be measured for the medium or a phase of the medium.

Because the straight measuring tube 10 is, as above described, caused to execute, during operation, lateral and torsional oscillations simultaneously or alternatingly, the measurement circuit can also be used to determine (derived from the excitation current $i_{exc}$, which, it is known, can serve also as a measure for an apparent viscosity or also a viscosity-density product) a measured value $X_X$ usable as a viscosity measured value and instantaneously representing a viscosity of the medium; compare, in this connection, also U.S. Pat. No. 4,524,610 or WO-A 95 16 897.

It is clear in this connection, without more, for those skilled in the art, that the inline measuring device can determine the separate measured values $X_x$, i.e. mass flow value $X_m$, a density value $X_ρ$, and a viscosity value $X_η$, respectively, for the various measured quantities x both in a common measuring cycle, thus with equal updating rates, as well as with different updating rates. For example, a very accurate measurement of the usually significantly varying mass flow rate requires usually a very high updating rate, while the comparatively less variable viscosity, η, of the medium can, where appropriate, be updated at larger separations in time. Additionally, it can, without more, be assumed that currently determined, measured values $X_x$ can be stored temporarily in the measuring device electronics and, therefore, be available for subsequent uses. Advantageously, the measurement circuit 21 can, furthermore, also be implemented by means of the signal processor DSP.

As already mentioned at the start, inline measuring devices with a vibratory transducer, especially Coriolis flowmeters, are widely used in industry for mass flow and density measurement of single-phase liquids or gases due to the high accuracy and flexibility of such devices. However, it is known that inhomogeneities and/or the formation of first and second phases in the flowing medium, for example gas bubbles and/or solid particles entrained in liquids, can lead to the result that a measured value determined in conventional manner assuming a single-phase and/or homogeneous medium will not match with sufficient accuracy the actual value of the quantity x whose measurement is desired, for example the mass flow rate m, i.e. the measured value must be appropriately corrected. This preliminarily determined, provisionally representing, or at least corresponding, value of the physical quantity x whose measurement is desired, which value, as already explained, can, for example, be a phase difference $\Delta\phi$ measured between the oscillation measurement signals $s_1$, $s_2$, or a measured oscillation frequency, of the measuring tube 11, is, consequently, referenced in the following as an initial measured value, or also a apparent value, $X'_x$. From this initial measured value $X'_x$, i.e. apparent mass flow value $X'_m$ or apparent density value $X'_\rho$, the evaluation electronics 21, in turn, finally derives the measured value $X_X$ representing the physical, measured quantity x sufficiently accurately, whether the physical, measured quantity x is the mass flow rate, the density, or the viscosity. Considering the very comprehensive and very well documented and detailed state of the art, it can be assumed that the determination of the initial measured or apparent value $X'_x$, which, for practical purposes, corresponds to the measured value generated in conventional manner, presents no difficulties for those skilled in the art, so that the initial measured value $X'_x$ can be taken as a given for the further explanation of the invention.

There is already discussion in the state of the art with reference to the mentioned inhomogeneities in the medium that these can immediately show up both in the phase difference measured between the two oscillation signals $s_1$, $s_2$ and in the oscillation amplitude or the oscillation frequency of each of the two oscillation measurement signals, respectively excitation current, thus in practically all of the usually measured, directly or indirectly, operational parameters of measuring devices of the described kind. This is true, especially in the case of the operational parameters determined with a laterally oscillating measuring tube, as is treated in WO-A 03/076880 or U.S. Pat. No. 6,311,136, U.S. Pat. No. 6,505,519; it can, however, also not always be excluded for operational parameters measured with a torsionally oscillating measuring tube—compare, in this connection, especially U.S. Pat. No. 4,524,610.

Further investigations have, however, led to the surprising discovery that, besides the well-known bubble effect there must be other significant effects that influence the measurement accuracy of In-line measuring devices with vibratory-transducer. Consequently, density and mass flow errors may not directly coupled as assumed in the classical bubble theory.

FIG. 7 shows a typical behaviour of a Coriolis flowmeter. To explain the positive measurement errors in mass flow together with negative measurement errors in density, which occur at low void fractions and which can not explained with the classical bubble theory, a novel moving resonator model was created. The Coriolis working principle under ideal conditions is our starting point for conceptualising this moving resonator. Then we consider the acoustic properties of liquid-gas mixtures and give an approximative resonator model. Finally, this resonator is integrated into the undisturbed flow meter which allows calculation of density and mass flow errors. For increasing the accuarcy of the resonator model, the error compensation based on the "bubble theory" may be included or integrated in this computation.

Figure 8:
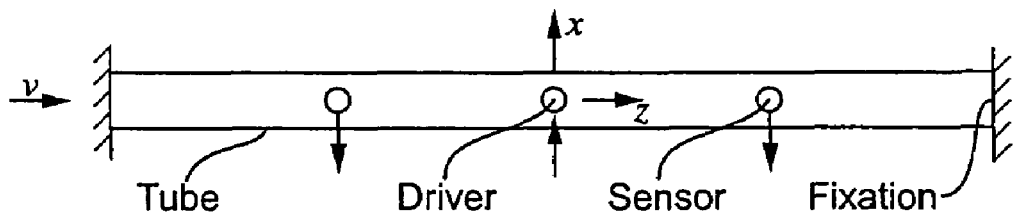
FIG. 8 shows schematically a Coriolis tube model.

First of all, the working principle of the Coriolis mass flowmeter under ideal conditions will be explained by means of an appropriate tube model. The commercially available units exhibit a broad variety of tube shapes. Here only the single straight tube, shown in FIG. 8, is regarded without any loss of generality. Typically, the tube with rigid supports at both ends vibrates in its first eigenmode with constant amplitude. It is forced by a driver placed at the centre to compensate dissipated energy. Evaluating the corresponding resonance frequency, the fluid density can be determined, see also Eq. (8). In the presence of flow, Coriolis forces are generated by the moving fluid in the inlet and the outlet of the tube having opposite directions because of the opposite sense of their local rotation. The second eigenmode is forced below its resonance frequency. So the first, symmetric driving mode and the second, antisymmetric Coriolis mode are superimposed 90° out of phase. Obviously the tube seems to tumble. The time shift between two harmonic sensor signals measured at the inlet and the outlet of the tube is directly proportional to the mass flow, see also Eq. (15). All this information can be derived by evaluating the governing equation of Coriolis flowmeters based on Bernoulli's beam equation $$E_t I_t \frac{\partial^4 x}{\partial z^4} + (A_t \rho_t + A\rho) \frac{\partial^2 x}{\partial t^2} + 2A\rho v \frac{\partial^2 x}{\partial t \partial z} = 0, \tag{1}$$

while damping and driver forces are neglected, where x is the displacement in vertical direction and z is the horizontal coordinate, $E_t$ is Young's modulus and $I_t$ is the second moment of area. $A_t$ and A define the areas of cross-section and $\rho_t$ and $\rho$ are the densities of the tube and the fluid, respectively. The first term represents the bending force layer of the tube, the second term gives the ordinary inertial force layers of tube and fluid and the third term on the left hand side gives the Coriolis force, where v is the velocity of the fluid. As mentioned above, the tube of length l is fixed at both ends $$x(z = \pm l/2, t) = 0, \tag{2}$$

$$\frac{\partial x}{\partial z}(z = \pm l/2, t) = 0. \tag{3}$$

In the first instance, we neglect the Coriolis force and solve Eq. (1), (2) and (3) by separation of variables. A detailed derivation can be found in [Rieder, A., Modellgestützte Auslegung und Realisierung eines Coriolis-Massedurchfluβmessers mit einem geraden Meβrohr, Fortschr.-Ber. VDI Reihe 8 Nr. 731, VDI Verlag, Düsseldorf, 1998] and [Raszillier, H., and Durst, F., Coriolis Effect in Mass Flow Metering, Arch. Appl. Mech., 61, pp. 192 214, 1991]. To simplify the treatment, a spatial transformation $$\zeta = \frac{2}{l} z \tag{4}$$

is introduced. In our solution we are only interested in the first two modes, which we call driving mode and Coriolis mode, denoted with the subscripts D and C, respectively. The corresponding eigenvalues $\gamma_D$ and $\gamma_C$ take the values 2.365 and 3.926. The corresponding normalized eigenforms $a_d$ and $a_C$ are $$a_D(\zeta) = \frac{\cosh\gamma_D\cos(\gamma_D\zeta) - \cos\gamma_D\cosh(\gamma_D\zeta)}{\sqrt{\int_0^1 (\cosh\gamma_D\cos(\gamma_D\tilde{\zeta}) - \cos\gamma_D\cosh(\gamma_D\tilde{\zeta}))^2 d\tilde{\zeta}}}, \quad (5)$$

$$a_C(\zeta) = \frac{\sinh\gamma_C\sin(\gamma_C\zeta) - \sin\gamma_C\sinh(\gamma_C\zeta)}{\sqrt{\int_0^1 (\sinh\gamma_C\sin(\gamma_C\tilde{\zeta}) - \sin\gamma_C\sinh(\gamma_C\tilde{\zeta}))^2 d\tilde{\zeta}}}. \quad (6)$$

Figure 9:
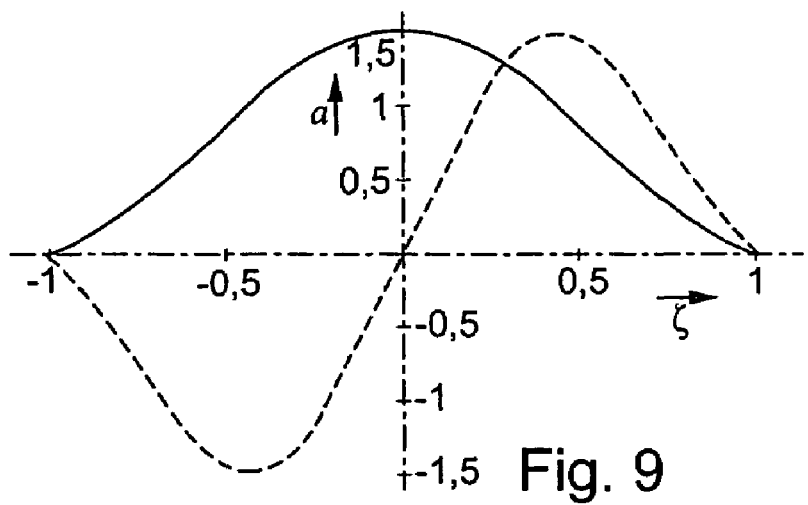
FIG. 9 shows orthonormal eigenforms of the driving mode (solid) and the Coriolis mode (dashed)

In FIG. 9 the symmetric driving mode and the antisymmetric Coriolis mode are shown. The driving frequency $f_D$ and the Coriolis frequency $f_C$ is given by $$\omega_{D,C} = 2\pi f_{D,C} \quad (7)$$
$$= \left(\frac{2\gamma_{D,C}}{l}\right)^2 \sqrt{\frac{E_t I_t}{A_t \rho_t + A\rho}}.$$

For an empty and a water filled steel tube with inner radius 0.05 m, wall thickness 0.004 m and length 1.5 m the working frequency $f_D$ is 286.7 Hz and 218.6 Hz, respectively. By converting Eq. (7), the fluid density $\rho$ depends on the measured driving frequency $f_D$ $$\rho = -\frac{A_t \rho_t}{A} + \frac{2^2 \gamma_D^4 E_t I_t}{\pi^2 l^4 A} \cdot \frac{1}{f_D^2} \quad (8)$$
$$= c_0 + c_1 \cdot \frac{1}{f_D^2}.$$

To determine the mass flow, we specify the decomposed approximation of the harmonic solution $$x(\xi,t) = \Re\{(\underline{A}_D a_D(\xi) + \underline{A}_C a_C(\xi))e^{j\omega_D t}\}, \quad (9)$$

with the complex modal amplitudes $\underline{A}$ and the eigenforms a. Next we insert Eq. (9) with Eq. (4), (5) and (6) into the left hand side of Eq. (1), multiply it with Eq. (6) and integrate along the tube $$\int_{-l/2}^{l/2} (LHS \text{ Eq. }(1)) a_c(z) dz = 0. \quad (10)$$

As result of this modal decomposition, we obtain $$\underline{A}_C = \frac{k_C}{(1 - \omega_D^2/\omega_C^2)} \cdot j\omega_D c_{CD} \dot{m} \underline{A}_D, \quad (11)$$

where $$k_C = (E_t I_t (2\gamma_C/l)^4)^{-1}, \quad (12)$$

-continued $$c_{CD} = \frac{2}{l} \int_{-1}^{1} a_D'(\zeta) a_C(\zeta) d\zeta, \quad (13)$$

$$\dot{m} = A\rho v \quad (14)$$

are yieldingness ($k_c$), Coriolis coupling coefficient ($c_{CD}$), and mass flow ($\dot{m}$), respectively. As mentioned above, the Coriolis mode $\underline{A}_C$ is excited by the driving mode $\underline{A}_D$ via the mass flow. Finally, the mass flow is related with the time shift $\Delta t$ between the two harmonic sensor signals by $$\dot{m} = \frac{(1 - \omega_D^2/\omega_C^2)}{k_C c_{DC}} \cdot \Re\left\{\frac{\underline{A}_C}{j\omega_D \underline{A}_D}\right\} \overset{\Delta t/2}{=} c_2 \cdot \Delta t. \quad (15)$$

The modal amplitudes can be derived from the sensor signals by building sum and difference followed by synchronous demodulation.

To understand the error mechanism in multi-phase conditions, we are further interested in the global acoustic properties of the liquid-gas mixture. Therefore we neglect the local existence of discrete gas bubbles. For small amount of gas, the bubbles are usually small compared with the tube diameter and they are homogenously distributed. At this approximation level, the presence of bubbles manifests itself only in the modification of sound speed c and density $\rho$, uniform in the whole volume $$c = \left(\frac{\alpha}{c_g^2} + \frac{(1-\alpha)^2}{c_l^2} + \frac{\alpha(1-\alpha)\rho_l}{\gamma p}\right)^{-\frac{1}{2}}, \quad (16)$$

$$\rho = \rho_l(1 - \alpha). \quad (17)$$

Figure 10:
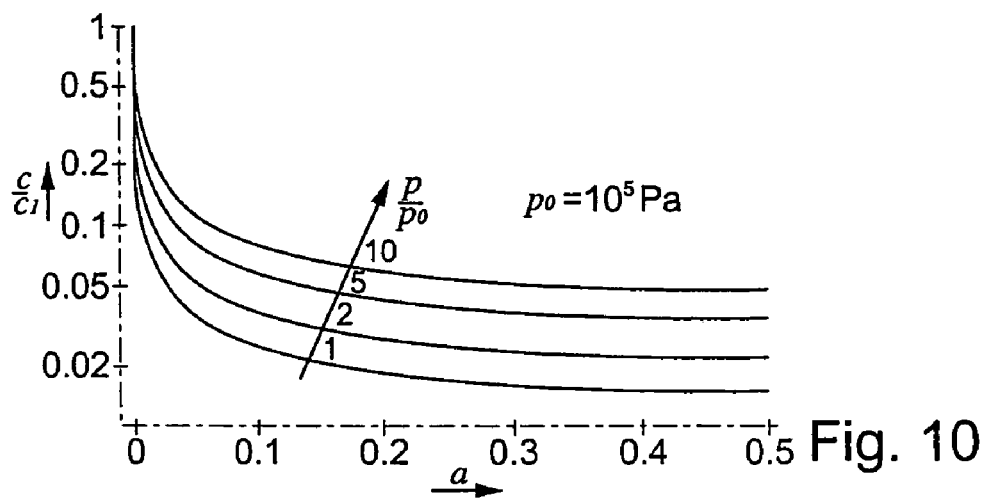
FIG. 10 shows a dependency of sound velocity on gas concentration and pressure.

Sound velocities in the gas, fluid and mixture are denoted by $c_g$, $c_l$ and c. Furthermore, $\rho_l$, $\rho$ and $\gamma$ are the density of liquid, the density of mixture and the adiabatic constant, respectively. The parameters taken into account are the gas volume concentration $\alpha$, also named void fraction, and the static pressure p. FIG. 10 shows the dependency of sound velocity on gas concentration for different pressures when the liquid phase is water and the gas phase is air. According to Eq. (16), the sound velocity in the mixture decreases dramatically even with a small gas concentration. If for example 1.5% air at $10^5$ Pa is injected, the sound velocity of water decreases from 1460 m/s to 95 m/s. This can be explained as a small amount of weak gas decreases the stiffness of the mixture greatly. The reduced sound velocity, in turn, decreases the resonance frequency of the mixture in the tube, which will be discussed below.

Knowing the mixture properties, we are able to describe the acoustic behaviour of the fluid in a laterally oscillating tube now. Following our derivation, we are especially interested in the lowest dominant eigenmode in the circular tube cross-section. So we evaluate the wave equation in this domain $$\Delta\phi - \frac{1}{c^2}\ddot{\phi} = 0, \quad (18)$$

where $\phi$ is the velocity potential and c is the sound velocity. The acoustic pressure p and the velocity vector $\underline{v}$ can be calculated by means of $$p = -\rho\dot{\phi}, \quad (19)$$

$$\underline{v} = \nabla\phi. \quad (20)$$

Along the tube, the physical quantities keep constant, thus the axial coordinate can be omitted. Since a tube of circular cross-section with radius R is concerned, Eq. (18) is expressed in cylindrical coordinates $(r, \theta)$ $$\frac{\partial^2\phi}{\partial r^2} + \frac{1}{r}\frac{\partial\phi}{\partial r} + \frac{1}{r^2}\frac{\partial^2\phi}{\partial \theta^2} - \frac{1}{c^2}\frac{\partial^2\phi}{\partial t^2} = 0. \quad (21)$$

For a tube at rest, the radial velocity along the tube wall vanishes. The corresponding boundary condition is $$\left.\frac{\partial\phi}{\partial r}\right|_{r=R} = 0. \quad (22)$$

Similar as done with Eq. (1), (2), and (3), one can solve Eq. (21) and (22) by separation of variables. Under these circumstances, the solution relies on the Bessel function of the first kind. The eigenvalues represent zero crossings of this function and the first one is given by $\lambda_1 = 1.842$. The corresponding eigenfrequency can be calculated with $$f_1 = c\frac{\lambda_1}{2\pi R}. \quad (23)$$

Figure 11:
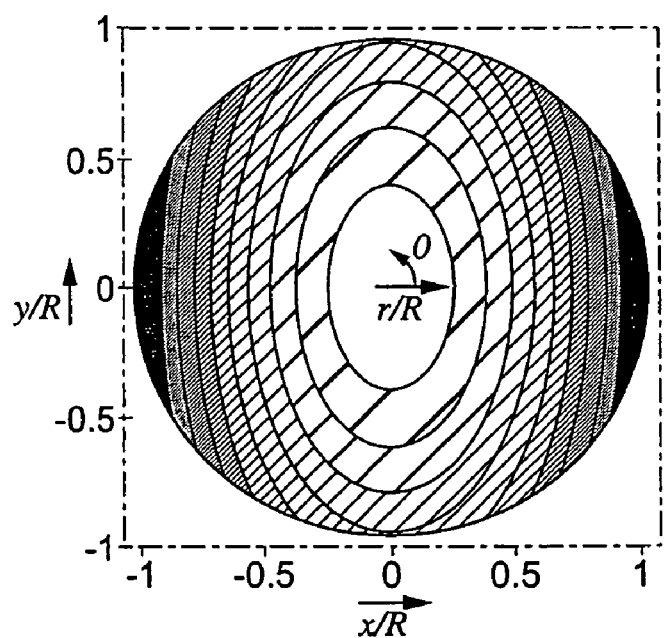
FIG. 11 shows the X-Component of the velocity field in the tube cross-section.

Continuing our example as described above for a conduit with radius R=0.05 m, the resonance frequency may fall down from 8557 Hz for pure water to 555 Hz for the mixture. The corresponding velocity field of the first eigenform based on the Bessel function is shown in FIG. 11. The maximum velocity of the x-component appears in the central region.

Another important parameter next to the resonance frequency $f_1$, is the modal mass layer $m_1$ of the first eigenmode. Because this is the dominant mode, later we only model the associated resonator. All masses of higher modes are collected in the inactive modal mass layer $m_0$ which sticks to the tube wall. The solution can be derived by exploiting the orthogonality of the eigenforms. With the corresponding mass fractions $r_1=0.837$ and $r_0=0.163$ and the tube cross-section area A, the following equation holds $$A\rho = m \quad (24)$$

$$= \sum_{i=1}^{\infty} m_i$$

$$= m_1 + \sum_{i=2}^{\infty} m_i$$

$$= m_1 + m_0$$

$$= A\rho(r_1 + r_0).$$

By replacing $\rho=\rho_l(1-\alpha)$ with $\rho=\rho_l(1-3\alpha)$ in Eq. (24) the "bubble effect" included in the model.

Figure 12:
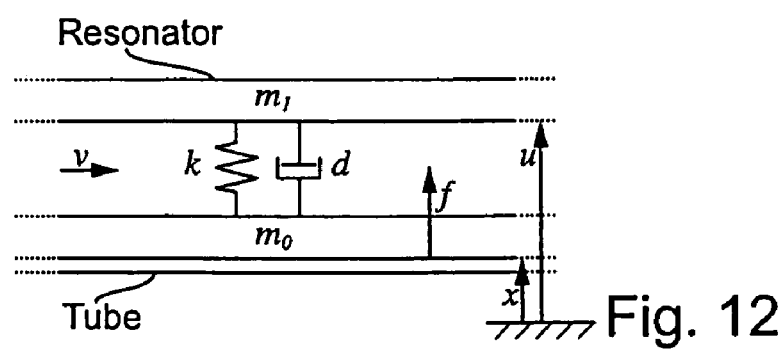
FIG. 12 shows a resonator forced by the tube.

The resonance frequency $f_1$ as well as the modal mass layers of resonator $m_1$ and inactive mass $m_0$ define the properties of the moving resonator model, shown in FIG. 12. Complementarily the quality factor $Q_1$ of the system can be measured and included into the model. It is essentially a single-degree forced excitation system [L. Meirovitch, *Elements of Vibration Analysis*, McGraw-Hill, New York, 1986.], where $m_1$ is the mass, k is the spring constant and d is the damping coefficient. When mass flow is present this resonator travels along the tube virtually. The tube represents the oscillating boundary x of the fluid domain which forces vibrations in the mixture. Due to the interaction, a reaction force layer f responds to the tube wall motion. We are interested in the transfer function H describing the dynamic relationship between x and f. Establishing the differential equations of motion and applying Laplace transformation we get $$H(s) = \frac{F(s)}{X(s)} \quad (25)$$

$$= \frac{(k+ds)s^2 m_1}{m_1 s^2 + ds + k} + m_0 s^2$$

$$= s^2\left[m_0 + m_1\frac{1 + \dfrac{s}{\omega_1 Q_1}}{1 + \dfrac{s}{\omega_1 Q_1} + \dfrac{s^2}{\omega_1^2}}\right],$$

where $$\omega_1 = 2\pi f_1 \quad (26)$$

$$= \sqrt{k/m_1},$$

$$Q_1 = \frac{1}{d}\sqrt{km_1}. \quad (27)$$

Further, we assume the resonator moves through the oscillating tube with the velocity v. Therefore the axial coordinate z is coupled to the time domain by the relationship $$z = vt - l/2. \quad (28)$$

Figure 13:
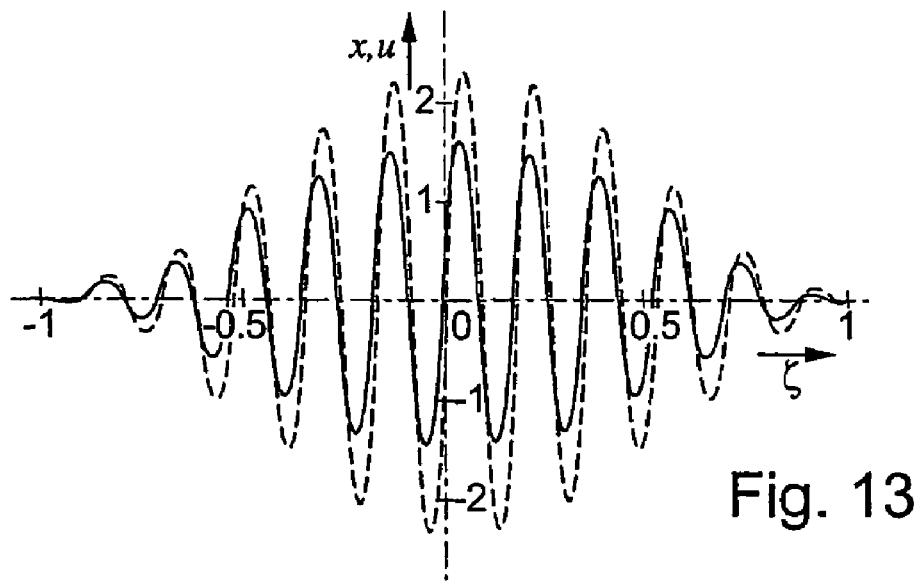
FIG. 13 shows an amplitude of tube x (solid) and resonator u (dashed)

The curves in FIG. 13 are based on the equations above and they are related to the driving mode. The solid one being the track of the inactive mass $m_0$ sticking to the tube and the dashed one being the resonator mass $m_1$, moving along the conduit. One can see that on the way through the tube an amplitude difference and phase shift occurs. Combining Eq. (4), (5), (6), (9), (25) and (28), one can calculate the reaction force f. In order to obtain the force layer in space, the time domain is transferred back to the space domain by using the inverse relationship to Eq. (28). Equation (29) results $$f(z) = \underline{f}_D A_D + \underline{f}_C A_C \qquad (29)$$
$$= \{L^{-1}[H(s)L(x(z = vt - l/2)e^{j\omega_D t})]e^{-j\omega_D t}\}\big|_{t=\frac{z+l/2}{v}},$$

where $$\underline{f}_{D,C}(\zeta) = \{L^{-1}[H(s)L(a_{D,C}(\zeta = 2vt/l - 1)e^{j\omega_D t})]e^{-j\omega_D t}\}\big|_{t=\frac{l(\zeta+1)}{v}} \qquad (30)$$

and L denotes the Laplace operator. Each modal component $\underline{f}_{D,C}$ of the force layer $\underline{f}$ is a complex and asymmetric function. For error calculation, these forces are decomposed in their real and imaginary as well as symmetric and antisymmetric components.

Finally, we calculate the mass flow and the density error in two-phase conditions. Therefore, all fluid-dependent terms in Eq. (1) are replaced by the reaction force of the moving resonator $\underline{f}$ in Eq. (29)

$$E_t I_t \frac{\partial^4 x}{\partial z^4} + A_t \rho_t \frac{\partial^2 x}{\partial t^2} + \underline{f} = 0. \qquad (31)$$

Analogous to Eq. (10), we perform a modal decomposition $$\int_{-l/2}^{l/2} (LHS\ Eq.\ (30)) a_{D,C}(z) dz = 0. \qquad (32)$$

As first result, we obtain Eq. (33) to determine the system actual driving frequency $\tilde{f}_D$ in an iterative calculation procedure $$2\pi \tilde{f}_D = \tilde{\omega}_D^{i+1} \qquad (33)$$
$$= \left(\frac{2\gamma_D}{l}\right)^2 \sqrt{\frac{E_t I_t}{A_t \rho_t + A\left(-\frac{1}{2A(\tilde{\omega}_D^i)^2}\int_{-1}^{1} \Re\{\underline{f}_D(\zeta)\}a_D(\zeta)d\zeta\right)}}.$$

Knowing this driving frequency $\tilde{f}_D$, we get the disturbed or apparent density $\tilde{\rho}$ as shown in Eq. (33) and the corresponding actual quality factor $\tilde{Q}_D$ $$\tilde{Q}_D = \frac{E_t I_t (2\gamma_D/l)^4}{\frac{1}{2}\int_{-1}^{1} \Im\{\underline{f}_D(\zeta)\}a(\zeta)d\zeta}. \qquad (34)$$

By measuring this factor, we can adapt the resonator quality factor $Q_1$. With Eq. (33), the density error between true density, $\rho$, and apparent density, $\tilde{\rho}$, in two-phase conditions is given by $$E_\rho = \frac{\tilde{\rho}}{\rho} - 1 \qquad (35)$$
$$= -\frac{1}{2\tilde{\omega}_D^2 A \rho}\int_{-1}^{1} \Re\{\underline{f}_D(\zeta)\}a_D(\zeta)d\zeta - 1.$$

By evaluating Eq. (32), we additionally get the Coriolis coupling coefficient under mixture $$\tilde{c}_{CD} = -\frac{1}{2\tilde{\omega}_D A \rho v}\int_{-1}^{1} \Im\{\underline{f}_D(\zeta)\}a_C(\zeta)d\zeta. \qquad (36)$$

If we assume that the system damping is not too low ($Q_D > 10$) and the ratio of driving and Coriolis frequency stays constant ($\omega_D/\omega_C$=const.), the mass flow error can finally be calculated by means of $$E_{\dot{m}} = \frac{\tilde{\dot{m}}}{\dot{m}} - 1 \qquad (37)$$
$$= \frac{\tilde{c}_{CD}}{c_{CD}} - 1$$
$$= \frac{l}{4\tilde{\omega}_D \frac{A\rho v}{\dot{m}}} \frac{\int_{-1}^{1} \Im\{\underline{f}_D(\zeta)\}a_C(\zeta)d\zeta}{\int_{-1}^{1} a'_D(\zeta)a_C(\zeta)d\zeta} - 1.$$

The Coriolis coupling coefficient $C_{CD}$, which is used here as a reference value for the mode coupling in case of homogeneous one-phase media, may by calibrated previously under appropriate one-phase condition. Based on the derivation above, now we can compute the measurement errors, both for density as shown in Eq. (35) and the mass flow rate as shown in Eq. (37) when the gas concentration in liquid is non-zero.

The model of the moving resonator including the "bubble effect" may implemented numerical in a computer algebra system, for instance directly in the above mentioned microcomputer 55. Parameters and constants, which may used for the model are listed in Table 1. Corresponding results for two different gas volume concentrations, $\alpha_1=1.5\%$ and $\alpha_2=15\%$, as well as two different pressures, $p_1=1\times 10^5$ Pa and $p_2=5\times 10^5$ Pa are shown in Table 2.

Figure 14:
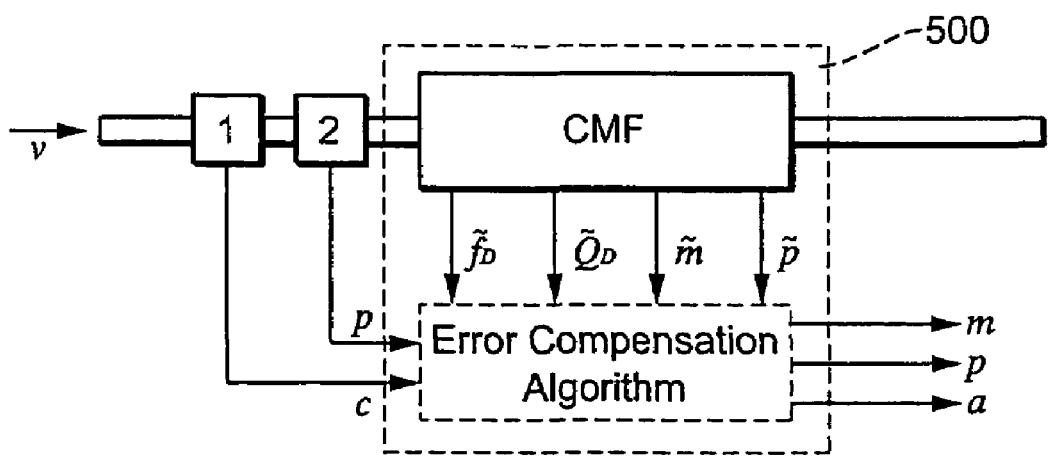
FIG. 14 shows schematically an inline measuring device with an error compensation according to the invention.

As shown in FIG. 14, the moving resonator model as described above can be utilized to compensate the measurement errors of Coriolis meters. Therefor, the following error compensation setup could be used, for example: Import values are the separately measured mixture sound speed c and measured values of the Coriolis mass flowmeter, such as actual driving frequency $\tilde{f}_D$, quality factor $Q_D$ of the system, apparent density $\tilde{\rho}$ and apparent mass flow $\tilde{\dot{m}}$. The system quality factor $Q_D$ is a function of driving current $I_D$. Knowing the mixture sound speed c with Eq. (23) we can determine the resonator frequency $f_1$. Using Eq. (33) and Eq. (34) the unknown parameters gas volume concentration $\alpha$ and resonator quality factor $Q_1$ are adapted in an iterative procedure. Therefore the differences between measured and calculated values of system quality factor $Q_D$ and actual driving frequency $\tilde{f}_D$ are minimized. Finally by using Eq. (35) and Eq. (37) the true mass flow $\dot{m}$ and the true mixture density $\rho$ can be determined. As a result, the error compensation algorithm gives the actual mass flow $\dot{m}$, the actual mixture density $\rho$ and the gas volume concentration $\alpha$.

An alternative error compensation setup may be: By measuring the mixture sound speed c and the pressure p with Eq. (16) the gas volume concentration a can be calculated. Alternatively this step can also be done by using an interpolated look up table, which consists of measured or calculated triples (c, p, $\alpha$). Knowing the mixture sound speed c with Eq. (23) we can determine the resonator frequency $f_1$. Using Eq. (34) the unknown parameter resonator quality factor $Q_1$ is determined. Therefore, in an iterative procedure the difference between measured and calculated system quality factor $Q_D$ is minimized. Finally by using Eq. (35) and Eq. (37) the true mass flow $\dot{m}$ and the true mixture density $\rho$ can be determined. As a result, the error compensation algorithm gives the actual mass flow $\dot{m}$, the actual mixture density $\rho$ and the gas volume concentration $\alpha$.

TABLE 1

Parameter set

| Parameters | Values |
|---|---|
| Length of the tube: l | 1.5 m |
| Inner radius of the tube: R | 0.05 m |
| Thickness of the tube: h | 0.004 m |
| Young-Modulus of the tube: $E_t$ | $210 \times 10^9$ N/m² |
| Density of the tube: $\rho_t$ | 8000 kg/m³ |
| Density of liquid: $\rho_l$ | 1000 kg/m³ |
| Sound velocity of liquid: $C_l$ | 1460 m/s |
| Sound velocity of gas: $C_g$ | 340 m/s |
| Adiabatic gas constant: $\gamma$ | 4/3 |
| Quality factor of the resonator: $Q_1$ | 10 |
| Fluid velocity: v | 1 m/s |
| Gas concentration: $\alpha$ | $\alpha_1 = 1.5\%$; $\alpha_2 = 15\%$ |
| Pressure: p | $p_1 = 1 \times 10^5$ Pa; $p_2 = 5 \times 10^5$ Pa |

TABLE 2

Calculated results

| Parameters | (0.0, p) | ($\alpha_1$, $p_1$) | ($\alpha_1$, $p_2$) | ($\alpha_2$, $p_1$) | ($\alpha_2$, $p_2$) |
|---|---|---|---|---|---|
| Sound velocity in the mixture: c | 1460.0 m/s | 94.7 m/s | 209.7 m/s | 32.3 m/s | 72.0 m/s |
| Resonance frequency of the mixture: $f_1$ | 8556.6 Hz | 555.3 Hz | 1228.8 Hz | 189.4 Hz | 522.0 Hz |
| Driving frequency of the system: $f_D$ | 218.6 Hz | 214.4 Hz | 219.4 Hz | 307.8 Hz | 235.6 Hz |
| Quality factor of the system: $Q_D$ | ∞ | 391.8 | 4880.0 | 16.6 | 309.7 |
| Density error: $E_\rho$ | 0.0% | 11.1% | −0.4% | −121.6% | −21.5% |
| Mass flow error: $E_m$ | 0.0% | 27.8% | 2.4% | −70.8% | −4.2% |

The invention claimed is:

1. A method for measuring a physical, measured quantity, of a mixture flowing in a pipeline, by means of an inline measuring device, including a measurement transducer of the vibration-type, and a measuring device electronics electrically coupled with said measurement transducer, said mixture consisting of at least one majority mixture component and at least one minority mixture component, said method comprising steps of:

causing the mixture to be measured to flow through at least one measuring tube of the measurement transducer, with the measuring tube being in communication with the pipeline;

feeding an excitation current into an exciter arrangement mechanically coupled with the measuring tube conducting the mixture, for causing the measuring tube to execute mechanical oscillations, and driving said measurement tube to oscillate with at least one instantaneous resonance frequency of a first natural eigenmode, and inducing Coriolis forces within the mixture flowing through the vibrating measurement tube;

sensing vibrations of the measuring tube and producing at least one oscillation measurement signal representing oscillations of the vibrating measuring tube;

estimating from the excitation current and from said at least one oscillation measurement signal a Coriolis coupling coefficient, said Coriolis coupling coefficient corresponding with an instantaneous coupling between said first natural eigenmode currently driven by the exciter arrangement and a second natural eigenmode of the measurement tube, in said second eigenmode the measurement tube having an eigenform corresponding with a mode of vibration caused by said Coriolis forces induced in the mixture, and said Coriolis coupling coefficient varying in time due to a variation of a concentration of at least one of said majority and said minority components of the mixture; and using said at least one oscillation measurement signal and/or the excitation current, together with said Coriolis coupling coefficient, for producing a measured value representing the physical, measured quantity to be measured.

2. The method as claimed in claim 1, further comprising the steps of:

determining a natural resonance frequency of a fluid resonator formed by the mixture volume within the vibrating measuring tube, and determining a quality factor for vibrations of said fluid resonator.

3. The method as claimed in claim 2, further comprising the step of:

generating a quality factor value representing said quality factor for vibrations of said fluid resonator actually.

4. The method as claimed in claim 3, wherein:

said step of generating the quality factor value is operated iteratively.

5. The method as claimed in claim 1, further comprising the steps of:

determining a sound speed of the mixture to be measured and generating a sound speed value representing the speed sound of the mixture actually; and using said sound speed value for estimating said Coriolis coupling coefficient.

6. The method as claimed in claim 5, wherein:

said natural resonance frequency of said fluid resonator is derived from said sound speed value.

7. The method as claimed in claim 1, further comprising the steps of:

determining a void fraction of the mixture to be measured and generating a concentration value representing a concentration of at least one of said majority and said minority components within the mixture actually; and using said concentration value for estimating said Coriolis coupling coefficient.

8. The method as claimed in claim 7, wherein:
said step of generating said concentration value is operated iteratively.

9. The method as claimed in claim 1, wherein:
said step of estimating said Coriolis coupling coefficient comprising at least one of the steps of:
determining an instantaneous driving frequency of the vibrating measuring tube conducting the mixture;
determining an instantaneous quality factor of the vibrating measuring tube conducting the mixture to be measured;
determining a static pressure of the mixture,
determining an apparent density of the mixture; and
determining an apparent mass flow of the mixture.

10. The method as claimed in claim 9, wherein:
the quality factor of the vibrating measuring tube conducting the mixture to be measured is derived from said excitation current.

11. The method as claimed in claim 1, wherein:
the physical, measured quantity is a mass flow rate of said at least one majority component of the mixture.

12. The method as claimed in claim 1, further comprising the step of:
determining a quality factor for vibrations of a fluid resonator formed by the mixture volume within the vibrating measuring tube.

13. The method as claimed in claim 12, wherein:
the step of determining a quality factor for vibrations of said fluid resonator comprising the step of determining a natural resonance frequency of a fluid resonator formed by the mixture volume within the vibrating measuring tube.

14. The method as claimed in claim 13, further comprising the step of:
generating a quality factor value representing said quality factor for vibrations of said fluid resonator actually.

15. The method as claimed in claim 1, further comprising the step of:
using said excitation current for determining a quality factor for vibrations of a fluid resonator formed by the mixture volume within the vibrating measuring tube.

16. The method as claimed in claim 1, further comprising the steps of:
determining a quality factor for vibrations of a fluid resonator formed by the mixture volume within the vibrating measuring tube and generating a quality factor value representing said quality factor for vibrations of a fluid resonator actually; and
generating a concentration value representing a concentration of at least one of said majority and said minority components within the mixture actually and using said concentration value for estimating said Coriolis coupling coefficient, wherein:
said steps of generating said quality factor value and of generating said concentration value are operated iteratively.

17. The method as claimed in claim 16, further comprising at least on of the following steps:
determining a natural resonance frequency of said fluid resonator; and
determining a void fraction of the mixture to be measured.

18. The method as claimed in claim 1, wherein:
the physical, measured quantity is a mass flow rate of said mixture flowing in a pipeline.

19. The method as claimed in claim 1, wherein:
the inline measuring device is a Coriolis mass flow measuring device.

20. An inline measuring device for the measurement of at least one physical, measured quantity x, of a two-phase or a multi-phase mixture, flowing in a pipeline, said inline measuring device comprising: a vibratory-type transducer; and measuring device electronics electrically coupled with said vibratory-type transducer, said vibratory-type transducer including: at least one measuring tube inserted into the course of the pipeline, said at least one measuring tube serving for conducting the mixture to be measured, and said at least one measuring tube communicating with the connected pipeline, an exciter arrangement acting on the measuring tube for causing said at least one measuring tube to vibrate, and a sensor arrangement for sensing vibrations of said at least one measuring tube and for delivering at least one oscillation measurement signal representing oscillations of the measuring tube; wherein:
said measuring device electronics delivers, at least at times, an excitation current driving the exciter arrangement; and
said measuring device electronics adapted for estimating a Coriolis coupling coefficient corresponding with an instantaneous coupling between a first natural eigenmode currently driven by the exciter arrangement and a second natural eigenmode of the measurement tube.

21. The inline measuring device as claimed in claim 20, wherein:
said measuring device electronics is adapted to execute a step of estimating a Coriolis coupling coefficient from the excitation current and from said at least one oscillation measurement signal.

22. An inline measuring device as claimed in claim 20, wherein:
said measuring device electronics is adapted to effect at least one of the following:
determining a natural resonance frequency of a fluid resonator formed by the mixture volume within the vibrating measuring tube;
determining a quality factor for vibrations of said fluid resonator, and generating a quality factor value representing said quality factor for vibrations of said fluid resonator actually;
determining a sound speed of the mixture to be measured, generating a sound speed value representing the speed sound of the mixture actually, and using said sound speed value for estimating said Coriolis coupling coefficient;
determining a void fraction of the mixture to be measured;
generating a concentration value representing a concentration of at least one of said majority and said minority components within the mixture actually, and using said concentration value for estimating said Coriolis coupling coefficient.

23. The inline measuring device as claimed in claim 20, provided in a form of a Coriolis mass-flow/density measuring device and/or of a viscosity measuring device.

24. The inline measuring device as claimed in claim 20, wherein
the physical, measured quantity is a mass flow rate of said mixture flowing in a pipeline.

25. The inline measuring device as claimed in claim 20, wherein:
said measuring device electronics is adapted to effect the following:

determining a sound speed of the mixture to be measured, and generating a sound speed value representing the speed sound of the mixture actually, and using said sound speed value for determining a natural resonance frequency of a fluid resonator formed by the mixture volume within the vibrating measuring tube.

26. The inline measuring device as claimed in claim 20, wherein:

said measuring device electronics is adapted to effect at least one of the following for estimating said Coriolis coupling coefficient:

determining an instantaneous driving frequency of the vibrating measuring tube conducting the mixture;

determining an instantaneous quality factor of the vibrating measuring tube conducting the mixture to be measured;

determining a static pressure of the mixture;

determining an apparent density of the mixture; and determining an apparent mass flow of the mixture.

* * * * *